US011702501B2

(12) United States Patent
Torkelson et al.

(10) Patent No.: US 11,702,501 B2
(45) Date of Patent: Jul. 18, 2023

(54) METHODS FOR MAKING RECYCLABLE AND DEPOLYMERIZABLE POLYMER NETWORK MATERIALS VIA THIOURETHANE DYNAMIC CHEMISTRY

(71) Applicant: Northwestern University, Evanston, IL (US)

(72) Inventors: John M. Torkelson, Skokie, IL (US); Lingqiao Li, Houston, TX (US); Xi Chen, Evanston, IL (US)

(73) Assignee: Northwestern University, Evanston, IL (US)

( * ) Notice: Subject to any disclaimer, the term of this patent is extended or adjusted under 35 U.S.C. 154(b) by 291 days.

(21) Appl. No.: 16/913,635

(22) Filed: Jun. 26, 2020

(65) Prior Publication Data

US 2020/0407482 A1 Dec. 31, 2020

Related U.S. Application Data

(60) Provisional application No. 62/867,684, filed on Jun. 27, 2019.

(51) Int. Cl.
| | |
|---|---|
| *C08G 18/38* | (2006.01) |
| *C08J 11/12* | (2006.01) |
| *C08G 18/76* | (2006.01) |
| *C08G 18/16* | (2006.01) |
| *C08G 18/18* | (2006.01) |
| *C08G 18/20* | (2006.01) |
| *C08G 18/48* | (2006.01) |
| *C08G 18/10* | (2006.01) |

(52) U.S. Cl.
CPC ......... *C08G 18/3855* (2013.01); *C08G 18/10* (2013.01); *C08G 18/161* (2013.01); *C08G 18/168* (2013.01); *C08G 18/1858* (2013.01); *C08G 18/2063* (2013.01); *C08G 18/3876* (2013.01); *C08G 18/4825* (2013.01); *C08G 18/7621* (2013.01); *C08J 11/12* (2013.01); *C08J 2375/04* (2013.01); *C08J 2381/00* (2013.01); *Y02W 30/62* (2015.05)

(58) Field of Classification Search
CPC .............. C08G 18/3855; C08G 18/161; C08G 18/168; C08G 18/1858; C08G 18/7621; C08G 18/10; C08G 18/2063; C08G 18/3876; C08G 18/4825; C08J 11/12; C08J 2381/00; C08J 2375/04; Y02W 30/62

See application file for complete search history.

(56) References Cited

U.S. PATENT DOCUMENTS

| | | | |
|---|---|---|---|
| 9,815,808 B2 | 11/2017 | Hillmyer et al. | |
| 2002/0022713 A1* | 2/2002 | Tanaka .................. | C08G 59/66 351/159.01 |
| 2018/0237576 A1* | 8/2018 | Chatani .................. | C08G 18/73 |
| 2018/0312657 A1 | 11/2018 | Yue et al. | |
| 2019/0127583 A1 | 5/2019 | Leibler et al. | |

FOREIGN PATENT DOCUMENTS

| | | |
|---|---|---|
| WO | WO 2018/039331 A1 | 3/2018 |
| WO | WO 2019/063787 A1 | 4/2019 |
| WO | WO 2019/099944 A1 | 5/2019 |

OTHER PUBLICATIONS

Li et al., "Reprocessable Polymer Networks via Thiourethane Dynamic Chemistry: Recovery of Crosslink Density after Recycling and Proof-of-Principle Solvolysis Leading to Monomer Recovery," Macromolecules, 2019, vol. 52, No. 21, pp. 8207-8216.
Konuray et al., "The Use of Click-Type Reactions in the Preparation of Thermosets," Polymers, 2020, vol. 12, pp. 1-44, DOI:10.3390/polym12051084.
Li, et al., "Reprocessable polymer networks based on dynamic chemistry with concurrent dissociative and associative mechanisms: Judicious design leading to excellent reprocessability," Presentation given at the 2019 ACS Meeting in Orlando, FL on Apr. 1, 2019, pp. 1-17.
R. Rahmawati et al., "Microphase-separated structure and mechanical properties of cycloaliphatic diisocyanate-based thiourethane elastomers," Polym. J. 2019, vol. 51, pp. 265-273.
J. Shin et al., "Properties of polythiourethanes prepared by thiol-isocyanate click reaction," J. Appl. Polym. Sci. 2018, vol. 135, pp. 46070 (1-8).
T. Szmechtyk et al., "Polythiourethane microcapsules as novel self-healing systems for epoxy coatings," Polym. Bull. 2018, vol. 75, pp. 149-165.
J. Shin et al., "Segmented Polythiourethane Elastomers through Sequential Thiol-Ene and Thiol-Isocyanate Reactions," Macromolecules 2009, vol. 42, pp. 3294-3301.
A. Kultys et al., "The synthesis and characterization of new thermoplastic poly(thiourethane-urethane)s.," J. Polym. Sci., Part A: Polym. Chem. 2008, vol. 46, pp. 1770-1782.
N. Droger et al., "Characterization of the viscoelastic and mechanical properties of tightly cross-linked polythiourethane networks," J. Appl. Polym. Sci. 2008, vol. 107, pp. 455-462.
F. Gamardella et al., "A. preparation or poly(thiourethane) thermosets by controlled thiol-isocyanate click reaction using a latent organocatalyst," React. Funct. Polym. 2019, vol. 134, pp. 174-182.
E. Delebecq et al., "On the Versatility of Urethane/Urea Bonds: Reversibility, Blocked Isocyanate, and Non-isocyanate Polyurethane," Chem. Rev. 2013, vol. 113, pp. 80-118.
Q. Li et al., "Comparison of Small Molecule and Polymeric Urethanes, Thiourethanes, and Dithiourethanes: Hydrogen Bonding and Thermal, Physical, and Mechanical Properties," Macromolecules 2009, vol. 42, pp. 1824-1833.
A. Erice et al., "New injectable and self-healable thermoset polythiourethane based on S-aromatic thiourethane dissociative exchange mechanism," Polymer (2020), pp. 122461 (1-9).

* cited by examiner

*Primary Examiner* — Rabon A Sergent
(74) *Attorney, Agent, or Firm* — Bell & Manning, LLC

(57) ABSTRACT

Polythiourethane polymer networks that can be processed and/or recycled are provided. Also provided are methods of forming the polythiourethane polymer networks using excess thiol and/or a dual catalyst system and methods for reprocessing and recycling the polyurethane polymer networks. The polythiourethane polymer networks are based on thiourethane dynamic chemistry.

26 Claims, 20 Drawing Sheets

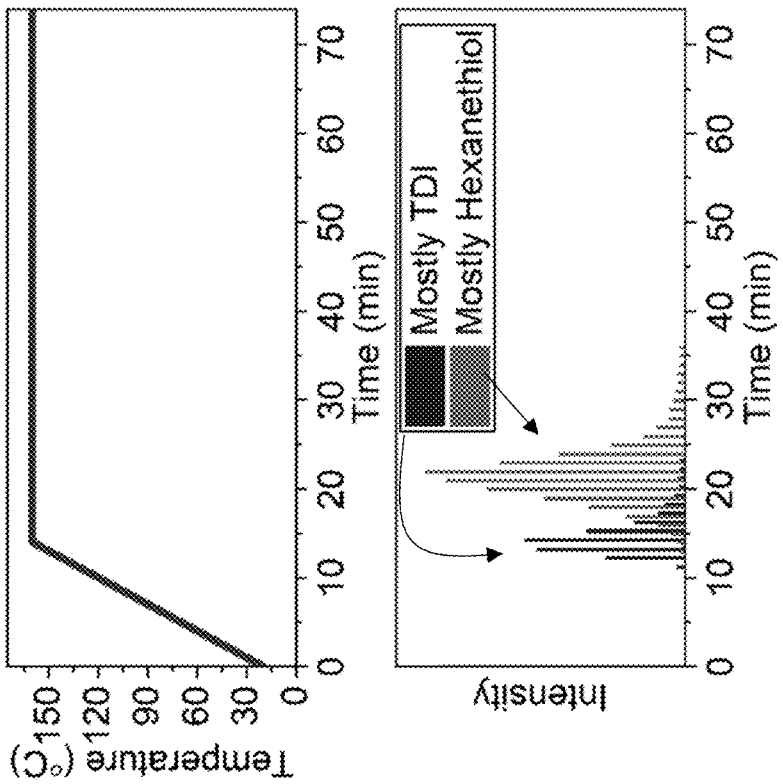
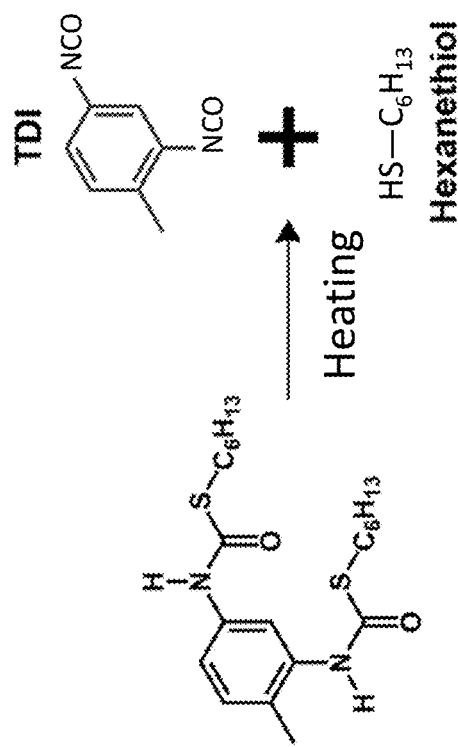
FIG. 3A  FIG. 3B  FIG. 3C

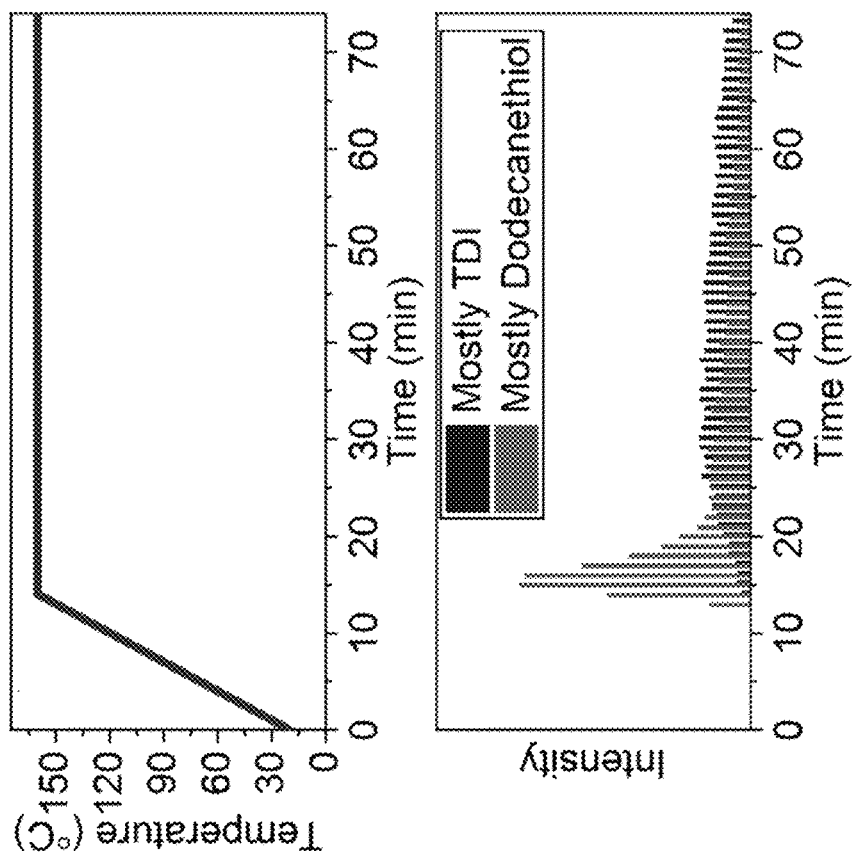
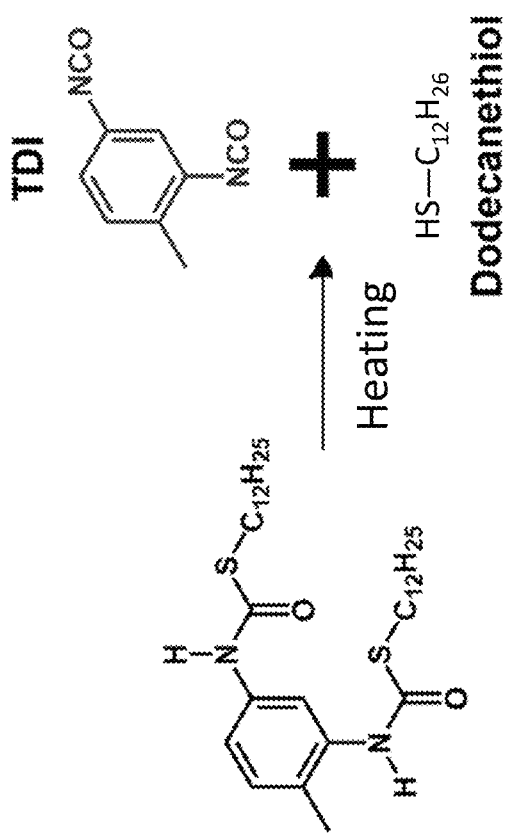
FIG. 9A
FIG. 9B
FIG. 9C

METHODS FOR MAKING RECYCLABLE AND DEPOLYMERIZABLE POLYMER NETWORK MATERIALS VIA THIOURETHANE DYNAMIC CHEMISTRY

CROSS-REFERENCE TO RELATED APPLICATIONS

The present application claims priority to U.S. provisional patent application No. 62/867,684 that was filed Jun. 27, 2019, the entire contents of which are incorporated herein by reference.

BACKGROUND

Covalently crosslinked polymers, or thermosets, are widely used in applications ranging from automobile, truck, and tractor tires to high technology aerospace materials. Because conventional crosslinked polymers have strong and fixed covalent bonds which result in covalent networks of chains, they usually have no ability to change shape or structure after curing (or "setting"). Thus, unlike thermoplastic polymers, which can be reprocessed in the melt state to allow for recyclability, conventional thermoset polymers cannot be remelted and cannot be recycled for high-value use. For example, recycling of crosslinked rubber tires is a major unmet need.

Polyurethanes are used in a wide range of applications, many of which, including elastomers, coatings, and foams, commonly involve cross-linked polyurethanes (PUs). Given that conventional cross-linked PUs cannot be effectively remolded and reprocessed, there is no efficient method for recycling spent, conventional PU networks for high-value applications.

A variety of dynamic chemistries have been employed or developed with the aim to achieve reprocessable polymer networks, which are sometimes referred to as covalent adaptable networks (CANs) or dynamic covalent polymer networks (DCPNs). These dynamic chemistries are commonly classified as belonging to one of two types: 1) associative exchange chemistries relying on exchange reactions between functional groups, e.g., transesterification and transamination; 2) dissociative dynamic chemistries based on dissociative reversible reactions, e.g., Diels-Alder addition and alkoxyamine chemistry. The dynamic chemistry associated with the catalyzed synthesis of reprocessable polyhydroxyurethane (PHU) networks was recently shown to involve both associative and dissociative mechanisms. (Chen, X. et al., *Polym. Chem.* 2017, 8, 6349-6355; Chen, X. et al., *ACS Appl. Mater. Interfaces* 2019, 11, 2398-2407; and Hu, S. et al., *ACS Sustainable Chem. Eng.* 2019, 7, 10025-10034.) Regardless of the mechanism, the reprocessing of such networks requires a particular stimulus, such as heating, to trigger sufficient levels of dynamic chemistry to accommodate melt-state reprocessing or malleability. Despite the progress made in the field of reprocessable polymer networks, significant issues remain as impediments to application. For example, many previous studies aimed at achieving reprocessable networks have, after starting with commercially available materials, employed multi-step syntheses that reduce the likelihood of commercial application. Additionally, relatively few studies have demonstrated full property recovery associated with cross-link density after reprocessing.

Traditional PU networks exhibit a very limited dynamic feature associated with transcarbamoylation, which is inadequate for remolding unless very high temperature is applied over a long time (180° C. for 2 h) and does not allow for full recovery of cross-link density. (Yan, P. et al., *RSC Adv.* 2017, 7, 26858-26866.) To overcome these limitations, previous studies have specifically aimed at achieving reprocessable PU or PU-like network materials. The majority of these studies retained the use of the traditional reaction between alcohols and isocyanates to create urethane linkages while aiming to achieve reprocessability via insertion of other dynamic functional groups. To avoid complicated synthesis, there is the option of PHU networks, which are intrinsically reprocessable via a one-step reaction between amines and cyclic carbonates with appropriate catalysis. However, the reaction to synthesize PHUs is typically relatively slow even in the presence of catalysts. Given that many use situations where traditional PU networks are synthesized and/or employed require easy and fast handling, e.g., foams, an ideal dynamic chemistry for recyclable PU substitutes should be simple, relatively rapid, and highly efficient.

Thiourethane chemistry involves reaction between thiols and isocyanates and has been described as a type of click chemistry due to its ultrafast reaction rate. Previous studies have used thiourethane chemistry for synthesizing linear polythiourethane (PTU) and thiourethane networks for non-recyclable purposes. Additionally, a study comparing urethane and thiourethane groups in linear polymers found that the two functional groups provide similar levels of hydrogen bonding, indicating that thiourethane-based polymers can be effective substitutes for PUs. (Li, Q. et al., *Macromolecules* 2009, 42, 1824-1833.) Despite these positive attributes, no previous study has demonstrated the effective use of thiourethane chemistry in the development of reprocessable polymer networks.

SUMMARY

Polythiourethane polymer networks, methods of forming the polythiourethane polymer networks, and methods for reprocessing and recycling the polyurethane polymer networks are provided.

One embodiment of a polythiourethane composition includes: a polythiourethane polymer network comprising polymer chains covalently linked by aliphatic crosslinkers via thiourethane linkages, wherein the aliphatic crosslinkers comprise free thiol groups; and a first catalyst that catalyzes reactions between thiol groups and isocyanate groups.

One embodiment of a method of forming a dynamic polythiourethane polymer network includes the steps of: (a) forming a composition that includes: (i) a polymer having at least two isocyanate groups; (ii) an aliphatic multifunctional thiol crosslinker comprising at least three free thiol groups, wherein the free thiol groups are present in a superstoichiometric concentration with respect to the isocyanate groups; and (iii) a first catalyst that catalyzes reactions between thiol groups and isocyanate groups; and (b) reacting the isocyanate groups on the polymer with the free thiol groups on the aliphatic multifunctional thiol crosslinker to form a crosslinked polythiourethane polymer network One embodiment of a method of reprocessing a polythiourethane polymer network utilizes a polythiourethane polymer network that includes: polymer chains covalently linked by aliphatic crosslinkers via thiourethane linkages, wherein the crosslinkers comprise free thiol groups; and a first catalyst that catalyzes reactions between thiol groups and isocyanate groups. The method includes the steps of: (a) heating the polythiourethane polymer network to a first temperature that induces reversible thiourethane bond cleavage; (b) reshaping the polythiourethane polymer network;

and (c) cooling the polythiourethane polymer network to a second temperature at which the reversible thiourethane bond cleavage is arrested.

Another embodiment of a polythiourethane composition includes: a polythiourethane polymer network comprising polymer chains covalently linked by crosslinkers via thiourethane linkages, wherein the crosslinkers comprise free thiol groups; a first basic catalyst that catalyzes reactions between thiol groups and isocyanate groups, the first basic catalyst having a pKa in water at 20° C. of at least 10; and a second basic catalyst that catalyzes reactions between thiol groups and isocyanate groups, the second basic catalyst having a pKa in water at 20° C. of 6 or lower.

Another embodiment of a method of forming a dynamic polythiourethane polymer network includes the steps of: (a) forming a composition that includes: (i) a polymer having at least two isocyanate groups; (ii) a multifunctional thiol crosslinker comprising at least three free thiol groups, wherein the free thiol groups are present in a superstoichiometric concentration with respect to the isocyanate groups; (iii) a first basic catalyst that catalyzes reactions between thiol groups and isocyanate groups, the first basic catalyst having a pKa in water at 20° C. of at least 10; and (iv) a second basic catalyst that catalyzes reactions between thiol groups and isocyanate groups, the second basic catalyst having a pKa in water at 20° C. of 6 or lower; and (b) reacting the isocyanate groups on the polymer with the free thiol groups on the multifunctional thiol crosslinker to form a crosslinked polythiourethane polymer network.

Another embodiment of a method of reprocessing a polythiourethane polymer network utilizes a polythiourethane polymer network that includes polymer chains covalently linked by crosslinkers via thiourethane linkages, wherein the crosslinkers comprise free thiol groups; a first basic catalyst that catalyzes reactions between thiol groups and isocyanate groups, the first basic catalyst having a pKa in water at 20° C. of at least 10; and a second basic catalyst that catalyzes reactions between thiol groups and isocyanate groups, the second basic catalyst having a pKa in water at 20° C. of 6 or lower. The method includes the steps of: (a) heating the polythiourethane polymer network to a first temperature that induces reversible thiourethane bond cleavage; (b) reshaping the polythiourethane polymer network; and (c) cooling the polythiourethane polymer network to a second temperature at which the reversible thiourethane bond cleavage is arrested.

An embodiment of a method of recovering multifunctional thiol monomers from a polythiourethane polymer network comprising polymer chains covalently linked by crosslinkers via thiourethane linkages, wherein the crosslinkers comprise free thiol groups, includes the steps of: reacting the polythiourethane polymer network with an alcohol that cleaves thiourethane linkages to generate multifunctional thiol monomers and diisocyanate polymers; and separating the multifunctional thiol monomers from the diisocyanate polymers.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

FIG. 3A shows the thermal decomposition of TU 6-6 thiourethane small molecules monitored by TGA-GCMS. FIG. 3B shows the time-temperature profile used for TGA-GCMS experiment; FIG. 3C shows regeneration of TDI (darker peaks) and hexanethiol (lighter peaks) as a function of time monitored by GCMS.

FIG. 9A shows thermal decomposition of TU 12-12 thiourethane small molecules monitored by TGA-GCMS. FIG. 9B shows the time-temperature profile used for TGA-GCMS experiment; FIG. 9C shows generation of TDI (darker peaks) and dodecanethiol (lighter peaks) as a function of time monitored by GCMS.

DETAILED DESCRIPTION

Figure 1:
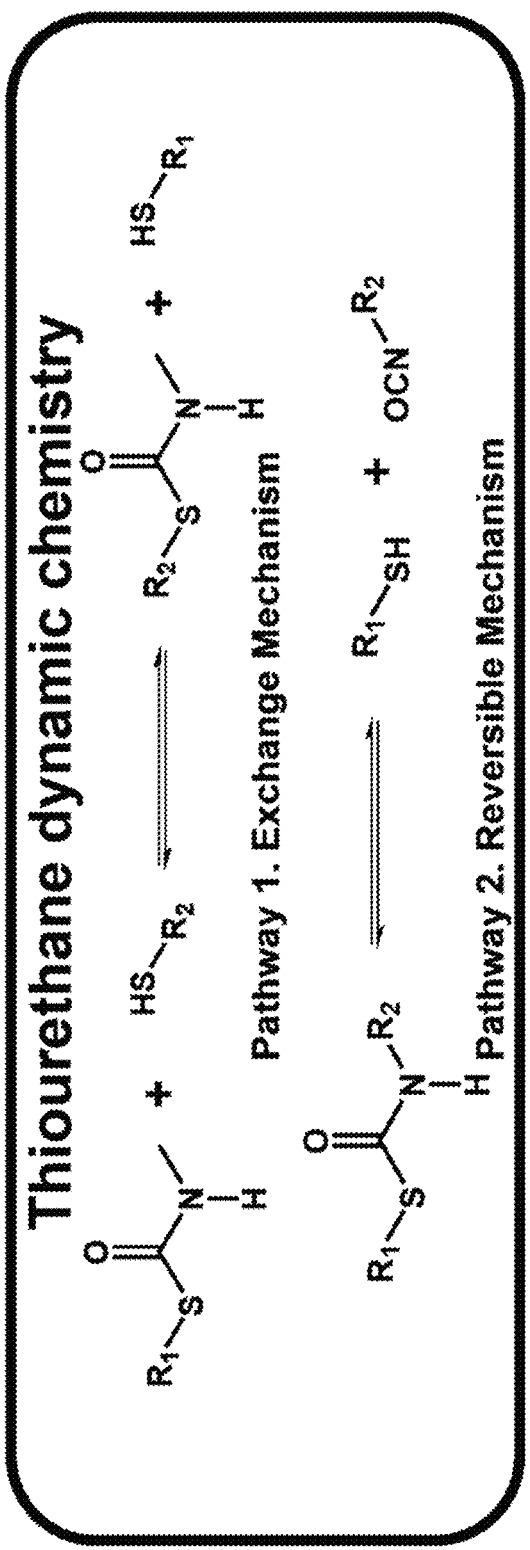
FIG. 1 shows two pathways associated with thiourethane dynamic chemistry that can used in reprocessable polymer network materials.

Polythiourethane polymer networks that are reprocessable and/or recyclable are provided. Also provided are methods of forming the polythiourethane polymer networks and methods for reprocessing and recycling the polyurethane polymer networks. The polythiourethane polymer networks are based on thiourethane dynamic chemistry.

The polythiourethane polymer networks are synthesized by facile catalyzed reactions of crosslinkers comprising multiple free thiol groups and isocyanate-functionalized polymers. The reprocessability of the polythiourethanes is enabled, at least in part, by the dual nature of the mechanism associated with catalyzed thiourethane dynamic chemistry, which is illustrated in the Example: at elevated temperature, thiourethane groups in the polymer network undergo exchange reactions with free thiol groups and also undergo reversible thermal reversion to thiols and isocyanates. This dynamic chemistry is used to synthesize crosslinked PTU polymer networks, at least some of which are able to achieve full recovery of crosslink density and tensile properties after multiple, relatively rapid remolding cycles.

One aspect of the invention utilizes polymers having isocyanate functionalities, in combination with an excess of thiol crosslinkers, including aliphatic thiol crosslinkers, and a catalyst to provide thermally reprocessable PTU polymer networks.

Another aspect of the invention utilizes excess thiol and a dual catalyst system that combines a strongly catalytic base catalyst with a weakly catalytic base catalyst to provide thermally reprocessable PTU polymer networks.

Yet another aspect of the invention provides methods for recovering the multifunctional thiol monomers used to make the dynamic TPU polymer networks via alcohol solvolysis.

When the PTU polymer networks are made using reaction mixtures having a small stoichiometric excess of thiol groups, the resulting PTU polymer networks may experience full recovery of cross-link density and tensile properties after multiple elevated-temperature reprocessing steps. Without intending to be bound by any particular theory of the inventions described herein, the inventors observe that the improved reprocessability of PTU dynamic networks made with excess thiol groups is consistent with excess thiol groups reducing the thermal reversion mechanism and promoting the thiol-thiourethane exchange reactions, which can, in turn, suppress deleterious isocyanate side reactions and promote excellent property recovery after multiple reprocessing steps.

Various embodiments of the methods and the polythiourethanes made therefrom provide one or more of the following advantages: the use of simple and efficient chemistry, excellent property recovery after recycling, the ability to directly recover monomers, the use of commercially available feedstocks, and fast reprocessing. Given these advantages the PTU dynamic networks offer major opportunities to develop high-value sustainable polymer networks in general and to design sustainable substitutes for high-value, crosslinked polyurethane networks in particular. Illustrative examples of applications in which the polythiourethane networks can be used include: recyclable polymer networks and network composite materials, adhesives with superior performance, coatings with advanced functions, e.g., self-healing, recyclable foams, stimuli-responsive materials, and hydrogel materials.

The PTU polymer networks can be synthesized by forming a composition containing a polymer having at least two terminal and/or pendant isocyanate (NCO) groups, a multi-functional thiol crosslinker having three or more free thiol (SH) groups, and at least one catalyst that catalyzes reactions between the isocyanate groups of the polymer and the thiol groups of the crosslinker. Various polymers having free isocyanate groups can be used in the synthesis, including isocyanate-terminated linear aliphatic polymers, isocyanate-terminated cyclic aliphatic polymers, and isocyanate-terminated aromatic polymers.

In some examples of the methods, the polymer used in the synthesis has at least two aromatic isocyanate groups. As used herein, the term "aromatic isocyanate group" refers to an isocyanate group in which the nitrogen of the isocyanate group is directly covalently bonded to a ring atom of an aromatic ring. Some examples of such polymers have the structure OCN—Ar—P—Ar—NCO, where Ar represents a chemical moiety having at least one aromatic ring, such as a functionalized or unfunctionalized benzene ring. Some embodiments of these example polymers have the structure OCN—Ar—NH—C(O)—P'—C(O)—NH—Ar—OCN. For example, Ar may be a toluene group, as in the case of a tolylene 2,4-diisocyanate-terminated polymer, a tolylene 2,6-diisocyanate-terminated polymer, or a mixture thereof. By way of further illustration, Ar may represent a functionalized or unfunctionalized biphenyl or diphenylmethane group.

In other examples of the methods, the polymer used in the synthesis has at least two aliphatic isocyanate groups. As used herein, the term "aliphatic isocyanate group" refers to an isocyanate group in which the nitrogen of the isocyanate group is directly covalently bonded to a linear aliphatic chain or an aliphatic ring, rather than an aromatic ring. Some examples of such polymers have the structure OCN-Ali-P-Ali-NCO, where Ali represents a functionalized or unfunctionalized aliphatic moiety.

The P and P' in the structures above represent a polymer backbone comprising a chain of covalently bonded carbon and, optionally, nitrogen and/or oxygen atoms, wherein the linear chain, P, typically includes at least eight atoms and the linear chain, P', typically includes at least four atoms. Some examples of the polymer chains, P and P', have 12 or more atoms, including polymer chains having 20 or more atoms. Pendant atoms and/or functional groups, such as oxygen atoms or alkyl groups, may extend from the polymer backbone chains. However, the polymer backbone chain may also be free of pendant groups. In some examples of the polymers, the polymer backbone is a polyether backbone, such as a polypropylene glycol (see, for example, FIG. 4; PPG diisocyanate), a polyethylene glycol, or a poly(oxytetramethylene)glycol backbone.

The multifunctional thiol crosslinkers include at least three free thiol groups. The crosslinkers are generally branched structures in which the branches terminate in thiol groups. Suitable crosslinkers include aliphatic thiols and aromatic thios. By way of illustration only, an example of a trifunctional thiol (i.e., a trithiol) is trimethylolpropane tris(3-mercaptopropionate and an example of a tetrafunctional thiol (i.e., a tetrathiol) is pentaerythritol tetrakis(3-mercaptopropionate). Penta-, hexa-, and higher functionality thiols can also be used.

The multifunctional thiol crosslinkers are present in the composition in a superstoichiometic concentration relative to the isocyanate-functionalized polymers. Because the reaction stoichiometry for the thiol-isocyanate crosslinking reaction is 1:1, this means the thiol group to isocyanate group mole ratio (SH:NCO) should be greater than 1. As a result, free thiol groups, which enhance polymer reprocessability, are present in the crosslinked PTU polymer network after the crosslinking reactions have gone to completion. In some examples of the compositions, thiol groups are present in an excess of 2 mol. % to 30 mol. %, relative to isocyanate groups. This includes compositions in which thiol groups are present in an excess of 5 mol. % to 20 mol. %, relative to isocyanate groups, and further includes compositions in which thiol groups are present in an excess of 5 mol. % to 15 mol. %, relative to isocyanate groups.

The compositions include at least one catalyst that is catalytically active for the reactions of thiol groups with isocyanate groups to form covalent thiourethane linkages. The catalyst can be a basic catalyst or a Lewis acidic catalyst. Basic catalysts include tertiary amines such as triethylamine (TEA) or amidine compounds such as 1,8-diazabicyclo[5.4.0]undec-7-ene (DBU) or 1,5-diazabicyclo[4.3.0]non-5-ene (DBN). Nucleophilic catalysts, such as organophosphines (e.g., triphenylphosphine) could also be used.

Highly reprocessable PTU polymer networks can be formed using a dual catalyst system that includes a first basic catalyst that is a strong catalyst for reactions between thiols and isocyanates and a second catalyst that is a weak catalyst for reactions between thiols and isocyanates. The first catalyst promotes fast gelation of the TPU polymer network at relatively low temperatures. For example, in the presence of the first catalyst, the polymer network may gel in a period of 10 minutes of less, including periods of 5 minutes or less and periods of 1 minute or less at temperatures in the range from about 22° C. to about 30° C. Basic catalysts having a pKa in water at 20° C. of at least 10 are suitable for use as the first catalyst. DBU and DBN are examples of strong base catalysts that can be used. The second catalyst of the dual catalyst system renders the TPU polymer network reprocessable at elevated temperatures on short time scales that avoid or minimize thermal damage to the TPU polymer network. For example, in the presence of the second catalyst, the TPU polymer network may be fully reprocessed with full or substantially full property recovery in 20 minutes or less at temperature in the range from 120° C. to 160° C. This includes examples of the TPU polymer networks that can be reprocessed with full or substantially full property recovery in 10 minutes or less, 1 minute or less, and 10 seconds or less at temperature in the range from 120° C. to 160° C. Basic catalysts having a pKa in water at 20° C. of 6 or less are suitable for use as the second catalyst. Triphenylphosphine is one example of a weak base catalyst that can be used.

In the dual catalyst system, the second, weaker catalyst is present at a substantially higher concentration. For example, the second catalyst may be present at a concentration that is 1000×, 2000×, or even 5000× greater than the concentration of the first catalyst. By way of illustration, the first catalyst may be present at a concentration of 0.001 wt. % or less, including a concentration of 0.0005 wt. % or less (e.g., in a range from 0.0001 wt. % to 0.001 wt. %), based on the total weight of the isocyanate-functional polymer, multifunctional thiol crosslinker, and catalysts, while the second catalyst may be present at a concentration in the range from 0.1 wt. % to 10 wt. %, including a range from 1 wt. % to 5 wt. %, based on the total weight of the isocyanate-functional polymer, multifunctional thiol crosslinker, and catalysts.

Once the compositions are formed, catalyzed click-type crosslinking reactions take place between the thiol-functionalized crosslinkers and the isocyanate-functionalized polymers to form a crosslinked PTU polymer network. The crosslinking can be carried out at low temperatures, such as temperatures in the range from about 22° C. to about 30° C. (e.g., room temperature; ~23° C.). Higher temperatures can be used, but to affect the initial crosslinking, the temperature is desirably below the temperature at which the thermal reversion mechanism that generates thiols and isocyanates becomes active.

The resulting crosslinked PTU polymer networks are characterized by polymer chains (for example, the P and P' chains described above) that are covalently linked by the crosslinkers via thiourethane linkages (—NH—C(O)—S—), wherein a small fraction of the thiol groups on the crosslinkers remain free (unreacted) due to the excess thiol used in the synthesis. The ratio of free thiol groups to thiourethane linkages in the crosslinked network may be in the range from, for example, 1:5 to 1:20. By way of illustration, in embodiments of the PTU networks synthesized using isocyanate-functionalized polymers having aromatic or aliphatic isocyanate functional groups, the crosslinked moieties, Ar or Ali, of the polymers can be represented by the structure . . . Ar(or Ali)-NH—C(O)—S—X—S—C(O)—NH—Ar (or Ali) . . . , where . . . represents the surrounding PTU polymer network structure and, for simplicity, X is used to represent a branched crosslinker core. (Although not explicitly shown here, the core X includes one or more additional branches terminating in another thiourethane linkage or a free thiol group.

The PTU polymer networks can be reprocessed by heating them from a temperature at which the dissociative reversible reaction that generates thiols and isocyanates (e.g., FIG. 1, bottom panel) is inactive or nearly inactive to an elevated temperature at which the dissociate reversible reaction becomes activated or significantly enhanced. At the elevated temperature, the PTU polymer networks are able to undergo structural changes through both thiol-thiourethane exchange (FIG. 1, top panel) and thiourethane thermal reversion (FIG. 1, bottom panel). Generally, suitable elevated temperatures include temperatures of at least 120° C., including temperatures of at least 130° C. For example, temperatures in the range from about 120° C. to about 160° C. are typically suitable. The PTU polymer network can then be reshaped (e.g., remolded) and then cooled, whereby the network structure becomes intact again. Notably, the thermal cycle used to reprocess the PTU polymer networks can be short (e.g., 20 minutes or less) and still provide the reprocessed PTU network with full, or substantially full (i.e., within 5%), crosslinking density and tensile strength recovery.

In addition to reprocessability, a second route for sustainable recycling of the spent PTU networks is the recovery of the thiol monomers that are used as crosslinkers by depolymerizing the polymer networks using alcohol solvolysis. This can be accomplished by forming a mixture of one or more alcohols and the PTU polymer network in an appropriate solvent, whereby the alcohol reacts with and cleaves the thiourethane linkage to release the thiol monomers that provided the crosslinks. This solvolysis can be conducted at low temperatures, such as temperatures in the range from about 22° C. to about 30° C., including room temperature.

However, temperatures outside of this range can also be used. A variety of alcohols can be used. However, since smaller alcohol molecules can diffuse more easily through the TPU polymer network, smaller alcohols, such as methanol may be preferred. Ethanol, propanol, and butanol are other examples of alcohols that can be used. Dichloromethane is an example of an acceptable solvent.

Example

Using small-molecule model systems, this example illustrates the dynamic features associated with thiourethane linkages. Notably, the results described herein demonstrate that thiourethane dynamic chemistry involves both associative exchange and dissociative reversible pathways (FIG. 1). To the best of the inventors' knowledge, this is only the second type of dynamic chemistry in the research field of reprocessable polymer networks that has been shown to involve dual associative and dissociative mechanisms, the other being catalyzed hydroxyurethane chemistry. (Chen, X. et al., 2017; Chen, X. et al., ACS Appl. Mater. Interfaces 2019; Hu, S. et al., 2019; and Chen, X. et al., Macromol. Chem. Phys. 2019, 220, 1900083.) Reprocessable thiourethane networks were synthesized by reacting a tetrafunctional thiol, pentaerythritol tetrakis(3-mercaptopropionate) (tetrathiol), and a difunctional isocyanate, tolylene 2,4-diisocyanate terminated poly(propylene glycol) (PPG diisocyanate), using appropriate catalysts. Gelation could be achieved within 1 min at room temperature, and the resulting networks exhibited full property recovery associated with cross-link density after three molding cycles. (Each molding cycle corresponded to pressing at 120° C. for 20 min and employed significantly lower temperature and shorter remolding time than previous studies targeting reprocessable PU or PU-like networks.) (Chen, X. et al., 2017; Chen, X. et al., ACS Appl. Mater. Interfaces 2019; Hu, S. et al., 2019; Chen, X.; et al., Macromol. Chem. Phys. 2019; and Fortman, D. J. et al., J. Am. Chem. Soc. 2015, 137, 14019-14022.) This excellent reprocessability was achieved by leveraging the advantages of thiourethane dynamic chemistry and optimizing the use of slightly non-stoichiometric levels of isocyanates and thiols as reactants; such optimization has not been previously reported in studies of reprocessable polymer networks. Lastly, by a proof-of-principle demonstration, it was indicated that thiourethane-based networks provide a second potential route to contribute to sustainability: recovering thiol monomers from spent thiourethane networks via alcohol solvolysis. While most previous studies aimed at recovering monomer from spent networks have employed pyrolysis, intense heating, or other harsh conditions, the method of recovering thiol monomers from waste polythiourethane (PTU) networks described herein employs relatively benign conditions. Thus, in addition to their ability to be recycled into reprocessed versions of original networks, spent PTU networks have the ability to be recycled by monomer recovery into a wide variety of new products.

EXPERIMENTAL

Materials.

1-hexanethiol (hexanethiol, 95%), 1-dodecanethiol (dodecanethiol, 98%), tolylene-2,4-diisocyanate (TDI, 95%), pentaerythritol tetrakis(3-mercaptopropionate) (tetrathiol, 95%), tolylene 2,4-diisocyanate terminated poly(propylene glycol) (PPG diisocyanate, average $M_n$~2300 g/mol, narrow distribution, isocyanate group~3.6 wt %), 1,8-diazabicyclo [5.4.0]undec-7-ene (DBU, 98%), triphenylphosphine ($PPh_3$, 99%), tetrahydrofuran (THF, anhydrous, 99.9%), dichloromethane (DCM, anhydrous, 99.8%), and chloroform-d ("100%", 99.96 atom % D, contains 0.03% (v/v) TMS) were from Sigma Aldrich. Methanol (99.9%) and hexanes (98.5%) were from Fisher Scientific. All chemicals were used as received without further purification.

Synthesis of Thiourethane Small Molecules (TU 6-6 and TU 12-12).

For synthesizing TU 6-6, TDI (2.0 g) was measured into a 20 mL glass vial and dissolved in anhydrous THF (4.0 mL). Hexanethiol (3.5 g) was then added dropwise into the vial with rigorous stir. Afterwards, one drop of DBU catalyst was added to the mixture using a glass pipette. The reaction was allowed to proceed 12 h at room temperature. The thiourethane product was collected by precipitation into hexanes. Before characterization, the product was recrystallized three times in hexanes and dried under vacuum to ensure purity. TU 12-12 was synthesized in a similar manner.

Exchange Reaction Between TU 6-6 and Dodecanethiol.

TU 6-6 (20 mg) was dissolved in DCM (4.0 mL) in a 20 mL vial. Dodecanethiol (5 µL) was added to the vial, which was sealed and maintained at room temperature for 48 h. The resulting mixture was diluted using DCM/methanol and immediately characterized by liquid chromatography-mass spectrometry (LCMS).

Exchange Reaction Between TU 6-6 and Methanol.

TU 6-6 (20 mg) was dissolved in DCM (4.0 mL) in a 20 mL vial. Methanol (1.0 mL) was added into the vial, which was sealed and left at room temperature for 24 h. The resulting mixture was diluted using DCM/methanol and immediately characterized by LCMS.

Synthesis of Thiourethane Elastomers.

Typically, a THF solution (2.177 mL) containing PPh3 (106.1 mg) and DBU (0.0177 mg, achieved through multiple dilutions) was first prepared. The solution was then combined with PPG diisocyanate (3.2 g) in a Max20 cup (Flacktek) and mixed at 3000 RPM for 1 min in a speed mixer (Flacktek DAC 150.1 FVZ-K). Afterwards, a THF solution (2.0 mL) containing tetrathiol (0.335 g) was prepared separately. The tetrathiol THF solution was added dropwise to the previously prepared mixture of PPG diisocyanate and base catalysts with stirring. The resulting reaction mixture in the Max20 cup was left at room temperature and gelled within 1 min. After gelation, the Max20 cup was placed on a hotplate at 80° C. for post-cure overnight. The resulting elastomeric solid was cut into small pieces and dried in vacuum at 50° C. for 48 h before use. Table 1 shows the formulations for thiourethane elastomers synthesized with different amounts of catalyst and/or stoichiometric imbalance.

TABLE 1

Formulations for synthesizing thiourethane polymer networks.

| | PPG diisocyanate (g) | Tetra-functional thiol (g) | DBU (mg) | $PPh_3$ (mg) | THF solvent (mL) |
|---|---|---|---|---|---|
| 0 mol % excess SH with 0 wt % $PPh_3$ | 3.200 | 0.335 | 0.0177 | 0.0 | 4.177 |
| 0 mol % excess SH with 1 wt % $PPh_3$ | 3.200 | 0.335 | 0.0177 | 35.4 | 4.177 |

TABLE 1-continued

Formulations for synthesizing thiourethane polymer networks.

| | PPG diisocyanate (g) | Tetra-functional thiol (g) | DBU (mg) | PPh$_3$ (mg) | THF solvent (mL) |
|---|---|---|---|---|---|
| 0 mol % excess SH with 3 wt % PPh$_3$ | 3.200 | 0.335 | 0.0177 | 106.1 | 4.177 |
| 0 mol % excess SH with 5 wt % PPh$_3$ | 3.200 | 0.335 | 0.0177 | 176.8 | 4.177 |
| 5 mol % excess SH with 3 wt % PPh$_3$ | 3.200 | 0.351 | 0.0177 | 106.1 | 4.177 |
| 10 mol % excess SH with 3 wt % PPh$_3$ | 3.200 | 0.368 | 0.0177 | 106.1 | 4.177 |
| 15 mol % excess SH with 3 wt % PPh$_3$ | 3.200 | 0.385 | 0.0177 | 106.1 | 4.177 |
| 20 mol % excess SH with 0 wt % PPh$_3$ | 3.200 | 0.401 | 0.0177 | 0.0 | 4.177 |
| 20 mol % excess SH with 1 wt % PPh$_3$ | 3.200 | 0.401 | 0.0177 | 35.4 | 4.177 |
| 20 mol % excess SH with 3 wt % PPh$_3$ | 3.200 | 0.401 | 0.0177 | 106.1 | 4.177 |
| 20 mol % excess SH with 5 wt % PPh$_3$ | 3.200 | 0.401 | 0.0177 | 176.8 | 4.177 |

Liquid Chromatography-Mass Spectrometry.

LCMS was used to characterize the molecular weight change after thiourethane exchange reactions and was performed using a Bruker AmaZon SL equipped with a quadrupole ion trap mass analyzer. Samples were prepared using a 1:1 v/v mixture of DCM/methanol as solvent and characterized immediately after preparation.

Thermogravimetric Analysis Coupled with Gas Chromatography-Mass Spectrometry (TGA-GCMS).

The thiourethane reversible reaction was characterized using TGA-GCMS. Typically, ~5 mg of thiourethane TU 6-6 or TU 12-12 was placed in an Al pan which was then placed in a Netzsch Jupiter F3 STA analyzer. The sample was heated in nitrogen according to a pre-programmed temperature profile, and decomposed molecules in the gas phase were directly injected into a coupled Agilent GCMSD equipped with a quadrupole mass analyzer. GCMS spectra were taken every 2 min for real-time gas phase composition determination.

Nuclear Magnetic Resonance Spectroscopy (NMR).

NMR was used to confirm the structure of thiourethane small molecules synthesized in this study. Samples were prepared by dissolving materials in chloroform-d at a concentration of ~10 mg/mL. H$^1$-NMR spectra were obtained using an Agilent DD MR-400 instrument.

(Re)Molding Materials.

The molding and remolding of thiourethane network materials were performed using a PHI hot press. Specifically, materials were first cut into millimeter-sized pieces and then hot pressed into ~1.0-mm-thick sheets using 7-ton ram force. Note that as-synthesized thiourethane elastomers (before molding) do not have a regular shape and cannot be directly used for mechanical property characterization. Thus, mechanical property characterization was mostly started on 1$^{st}$ mold materials, which were obtained by molding the as-synthesized materials. Similarly, 2$^{nd}$ mold materials were obtained by remolding the 1$^{st}$ mold materials; 3$^{rd}$ mold materials were obtained from remolding 2$^{nd}$ mold materials. Each molding cycle corresponds to hot pressing for 20 min at 120° C.

Fourier Transform Infrared (FTIR) Spectroscopy.

FTIR spectroscopy was used to characterize the chemical change of materials after each molding cycle. Solid and transparent film samples of thiourethane network polymers were directly mounted onto a Bruker Tensor 37 instrument for FTIR measurement.

Dynamic Mechanical Analysis (DMA).

DMA was used to characterize the thermo-mechanical properties of materials after each molding cycle. Specifically, tensile storage modulus, E', tensile loss modulus (E"), and damping ratio tan δ (=E"/E') were characterized as functions of temperature using a TA Instruments DMA III analyzer equipped with a liquid nitrogen cooler. The analyzer was operated in a strain-controlled mode (0.03% strain) at 2 Hz frequency. Data were obtained upon heating the tension-film sample in nitrogen atmosphere from −50° C. to 50° C. with a 3° C./min ramping rate. Stress relaxation behavior of thiourethane elastomers was also characterized by DMA using a TA Instruments RSA G2 analyzer. The initial step strain was fixed at 3%; each tension-film sample was maintained in nitrogen atmosphere during measurement.

Tensile Tests.

Room-temperature tensile properties of thiourethane networks were characterized after each molding step. Dog-bone shaped samples were directly cut from hot-pressed sheets using a Dewes-Gumb die. Samples were pulled under tension at 125 mm/min using a Sintech 20/g tensile tester, with data being taken at 300 data points per second. The Young's modulus, ultimate strength, and elongation at break were determined, with reported errors being standard deviations from five measurements.

Solvolysis of Thiourethane Network Polymers.

In a 20 mL glass vial, ~300 mg thiourethane network polymer was placed into a mixture of DCM (10.0 mL) and methanol (10.0 mL). The vial was then left on a hot plate equilibrated at 60° C. for a week, during which the solid network materials were gradually "dissolved".

Swelling Test.

The gel gel fraction of networks was determined by swelling tests. ~300 mg of network solid was placed into ~20 mL of DCM in a glass vial and maintained there at room temperature for a week. The liquid phase was replaced every day with fresh DCM. At the end, the solvent was decanted, and the resulting solid materials were thoroughly dried in vacuum before the weight was measured.

Results and Discussion

Small-Molecule Thiourethane Model Systems.

Figure 2A:
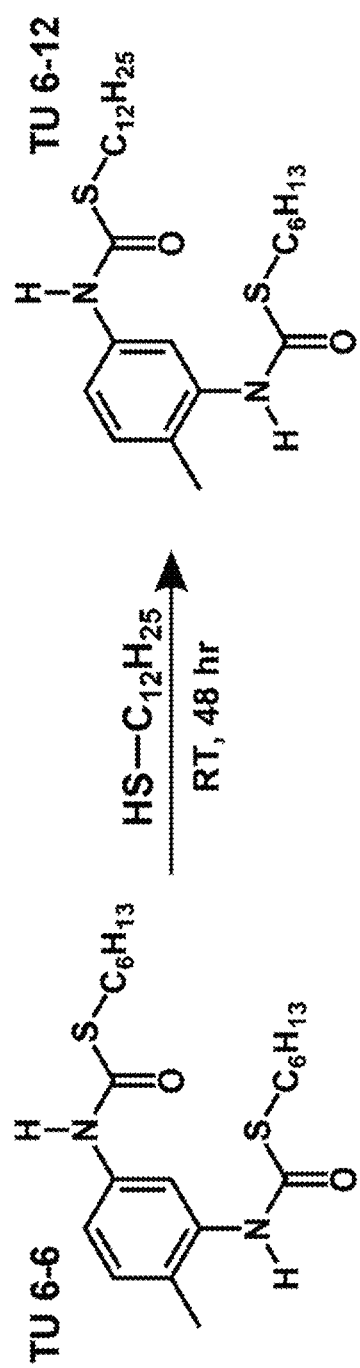
FIG. 2A shows an exchange reaction between TU 6-6 thiourethane small molecules and monofunctional thiols. Note that the TU 6-12 structure shown here is a representative structure.
Figures 2B, 2C:
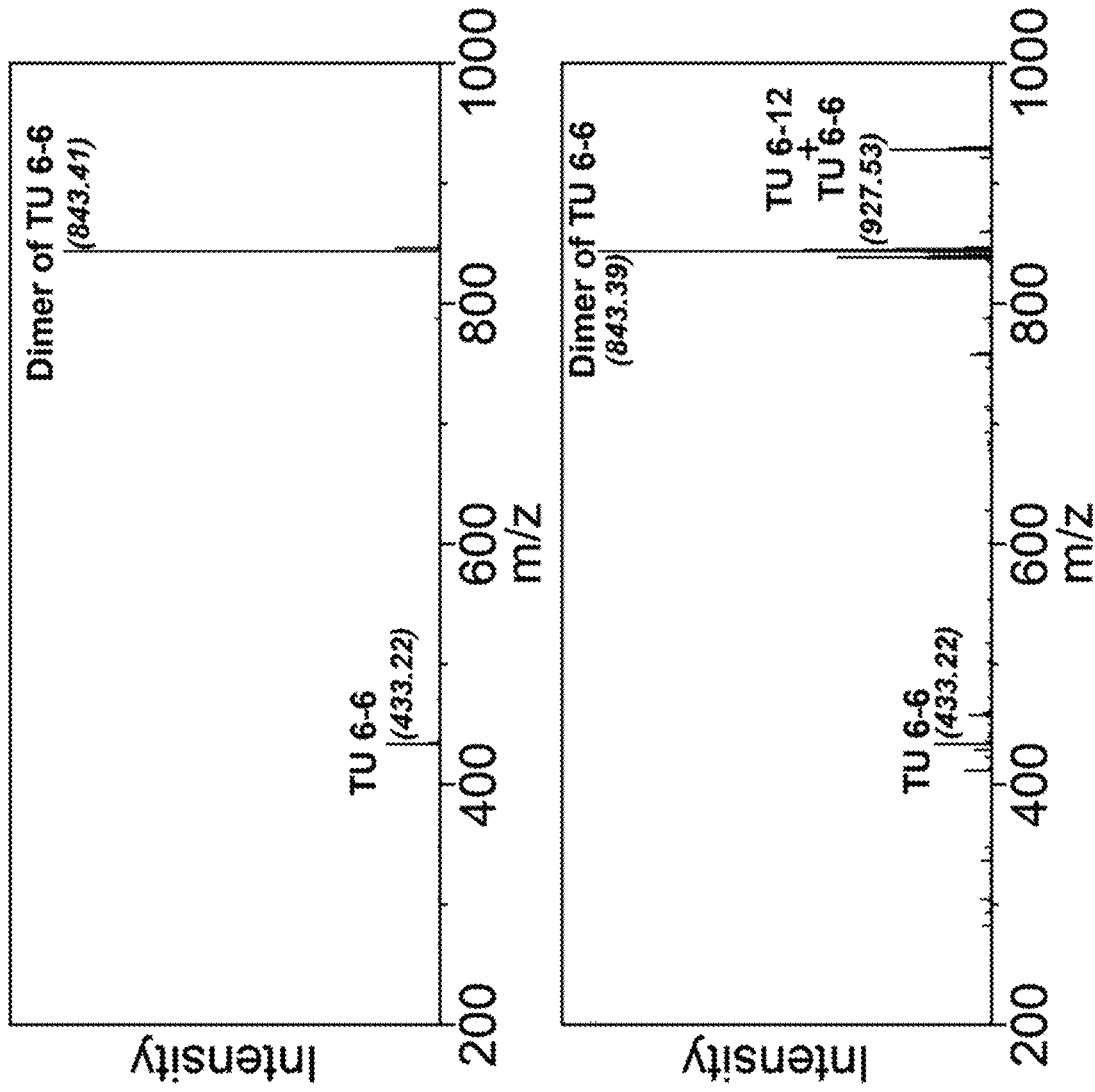
FIG. 2B shows a positive mode LCMS spectrum for TU 6-6 before exchange reaction.
FIG. 2C shows a positive mode LCMS spectrum for products after exchange reaction.
Figure 12A:
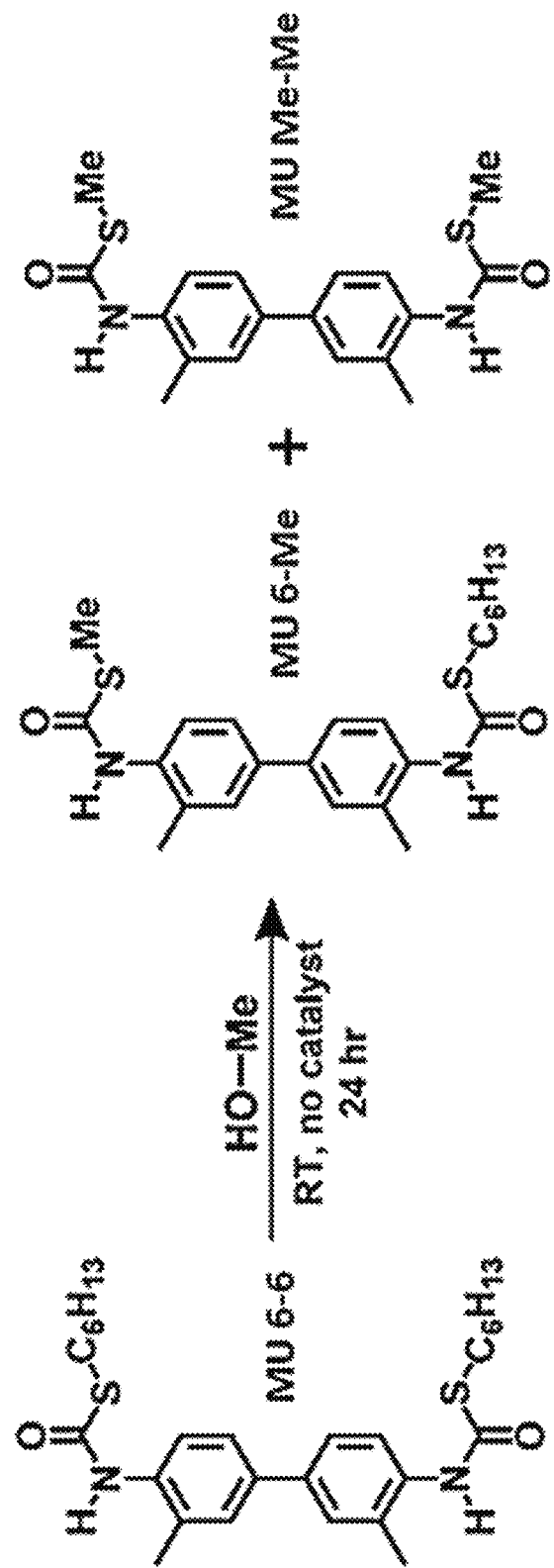
FIG. 12A shows exchange reaction between MU 6-6 thiourethane small molecules and methanol.
Figure 12B:
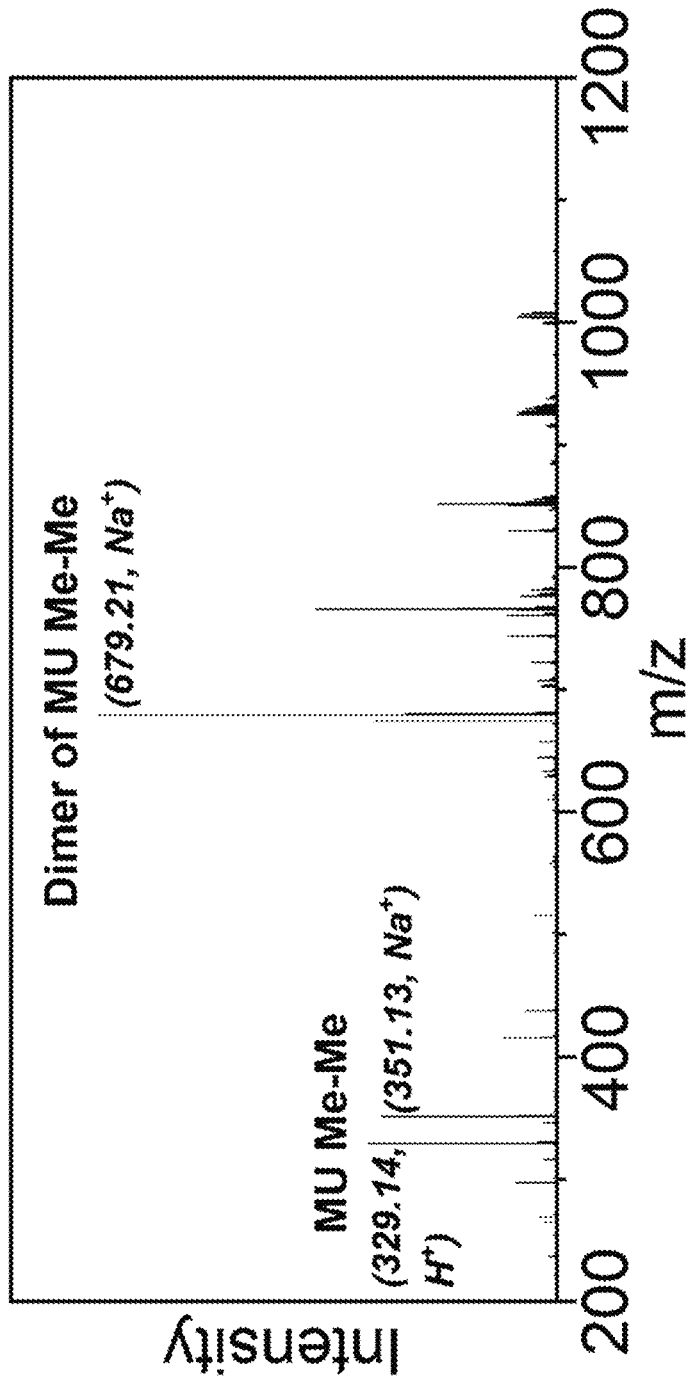
FIG. 12B shows the positive mode LCMS spectrum associated with products after exchange reaction.

FIG. 2A shows the small-molecule model system that was designed for investigating the associative exchange mechanism for thiourethane dynamic chemistry. A thiourethane small molecule, TU 6-6, was first synthesized by reacting TDI with hexanethiol. As shown in FIG. 2B, the LCMS spectrum for pure TU 6-6 exhibits peaks at 433.22 and 843.41 m/z, corresponding to TU 6-6 single molecule (410.21 g/mol) and dimer (820.42 g/mol) with a sodium ion charge (+22.99 g/mol), respectively. After mixing TU 6-6 with dodecanethiol in solvent for 48 h at room temperature, the LCMS spectrum of the resulting mixture in FIG. 2C exhibits an additional major peak at 927.53 m/z, with the difference with the TU 6-6 dimer peak being 84.16 m/z. Given that the molecular weight difference between hexanethiol (118.24 g/mol) and dodecanethiol (202.40 g/mol) is 84.16 g/mol, the new peak at 927.53 m/z corresponds to the adduct of TU 6-6 and TU 6-12, which was generated through dodecanethiol molecule exchange with TU 6-6. Note that the TU 6-12 structure in FIG. 2A is a representative structure of the exchange product; the exchange reaction could happen with both thiourethane groups connected to the aromatic ring, even the one that is shielded by a methyl group. (FIGS. 12A-12B.) Thus, with these small-molecule exchange reactions, it has been demonstrated that the thiourethane chemistry employed in dynamic network synthesis includes the associative exchange mechanism as a viable pathway.

The dissociative reversible thiourethane reaction was studied using TGA-GCMS. Dry powder of TU 6-6 was heated in nitrogen according to a preprogramed temperature profile (see FIGS. 3A-3B), and the thermal decomposition products were monitored in real-time using a coupled GCMS. The GCMS spectra obtained as a function of time were compared with a database to determine composition. Interestingly, it was found that decomposition products contained mostly TDI and hexanethiol, which were the feedstocks that were used to synthesize TU 6-6. FIG. 3C plots the composition of TDI and hexanethiol as a function of time: darker peaks associated with mostly TDI emerged at ~11 min (correlating to ~130° C.) and ended at ~24 min (correlating to 160° C.); lighter peaks associated with hexanethiol emerged at ~12 min (correlating to ~140° C.) and ended at ~36 min (correlating to 160° C.). Additionally, according to real-time TGA results, the heated sample lost almost all of its weight over the time frame of 11-36 min, indicating that the TU 6-6 sample decomposed mostly into its feedstocks. Similar results were obtained from the TGA-GCMS analysis on another thiourethane small molecule, TU 12-12, which was synthesized from TDI and dodecanethiol (FIGS. 9A-9C and FIGS. 11A-11C). Different from the thiol-thiourethane exchange reaction which can occur at room temperature, the TGA-GCMS results indicate that higher temperature is required to trigger thiourethane reversion. In other words, the thiourethane chemistry that was employed in dynamic network synthesis included the dissociative reversible reaction under conditions of appropriate heating.

It was noted that the TU 6-6 and TU 12-12 thiourethane small molecules contained a minute amount of DBU catalyst (~0.3 mol % according to LCMS spectra) which could not be easily removed using this purification method. The presence of such base catalyst likely facilitated the dynamic reactions in these small-molecule systems.

These small-molecule experiments demonstrate that the catalyzed thiourethane dynamic chemistry described herein is similar to the catalyzed hydroxyurethane dynamic chemistry in PHU dynamic networks in that both involve dual mechanisms of associative exchange reactions and dissociative reversion reactions.

Recycling of Thiourethane Polymer Networks by Reprocessing at 120° C. for 20 Min.

Figure 4:
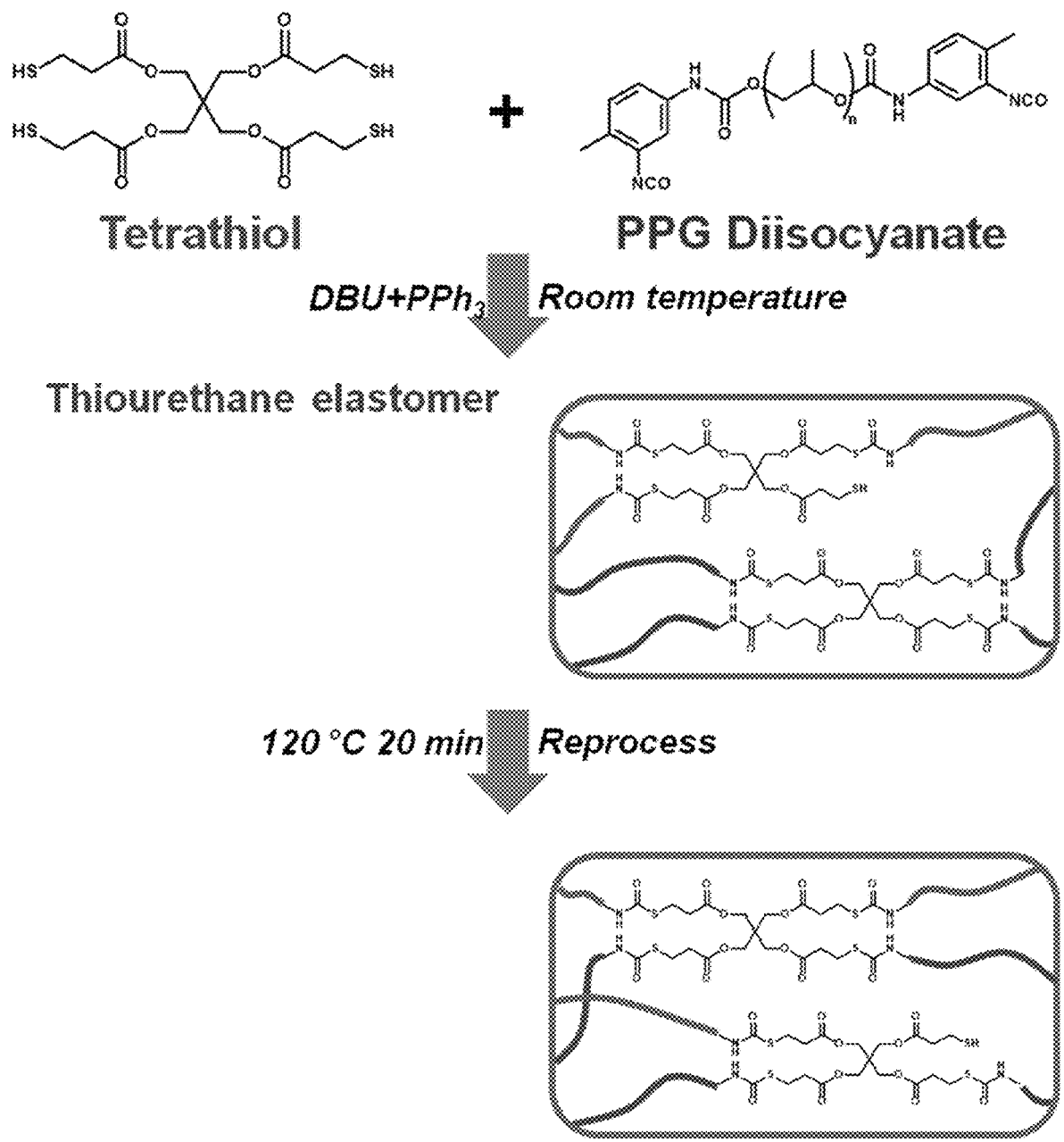
FIG. 4 shows a synthesis route for thiourethane polymer networks. All reactions were carried out at ambient temperature with 0.0005 wt % DBU and 3 wt % $PPh_3$ as catalysts.

To investigate the performance of thiourethane dynamic chemistry in reprocessable polymer networks, thiourethane network materials were synthesized from tetrathiol reacting with PPG diisocyanate as shown in FIG. 4. Note that a dual catalyst system was employed containing a trace amount of DBU (0.0005 wt % relative to monomers; all later values for catalyst loading are based on wt % relative to all monomers) and a small amount of PPh$_3$ (3 wt %). The reason behind this choice was that DBU catalyst is extremely efficient in catalyzing the reaction between thiol and isocyanate. For example, in the presence of a relatively small amount of DBU, e.g., 0.01 wt %, the reaction mixture could achieve gelation instantly upon mixing at room temperature. As a result, well-mixed reacting mixtures and relatively uniform network materials are not feasible using 0.01 wt % DBU. In contrast, the relatively weak base catalyst, PPh$_3$, is relatively inefficient in catalyzing the polymerization, not leading to gelation after days under ambient condition (with a loading of 3 wt %). Hence, the dual catalyst system containing a trace amount of DBU was employed, which was responsible for the fast gelation process (the reacting mixture gelled within in one minute at room temperature), and a small amount of PPh$_3$, which contributed significantly to the efficient reprocessing of resulting elastomers.

Figure 5A:
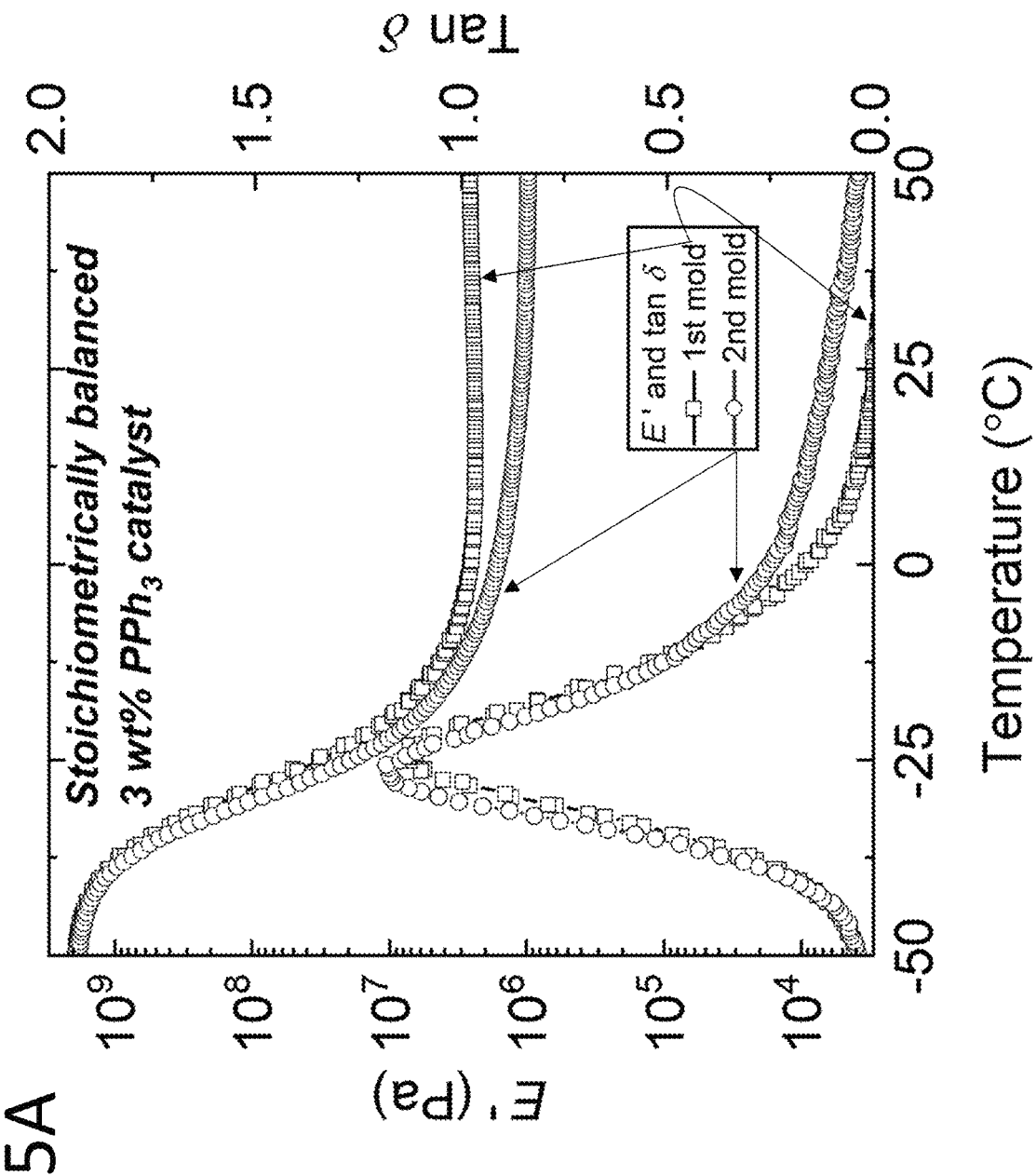
FIG. 5A shows E' and tan δ as functions of temperature for $1^{st}$ and $2^{nd}$ molded thiourethane polymer networks synthesized with stoichiometrically balanced thiol and isocyanate groups, as well as 3 wt % $PPh_3$ catalyst.

The resulting thiourethane elastomers were then reprocessed at 120° C. for 20 min as shown in FIG. 4. Upon heating, the thiourethane networks could undergo structural changes through both thiol-thiourethane exchange and thiourethane thermal reversion. Once cooled, the network structure became intact again, and thus the material was macroscopically reshaped and reprocessed. Specifically, FIG. 5A shows the DMA properties E' and damping ratio (tan δ) as functions of temperature for thiourethane networks synthesized from stoichiometrically balanced thiol and isocyanate groups. (For reprocessable networks, DMA is an especially important technique for characterizing property recovery after reprocessing because ideal rubbery elasticity theory, including both affine and phantom network models, indicates that the value of the rubbery plateau modulus is directly proportional to cross-link density.) (Flory, P. J., Cornell University Press, 1953; and James, H. M., *J. Chem. Phys.* 1947, 15, 651-668.) For this network synthesized with stoichiometrically balanced thiol and isocyanate groups, there was a major property loss in going from the $1^{st}$ mold to the $2^{nd}$ mold materials. According to the rubbery plateau storage modulus values measured at 40° C., these materials exhibited a ~60% reduction of cross-link density from the $1^{st}$ mold (2.53 MPa) to the $2^{nd}$ mold (0.99 MPa). Additionally, the tan δ peak (often interpreted as a shifted glass transition temperature, $T_g$) shifted to lower temperature upon $2^{nd}$ molding, indicating a decreased $T_g$ value. Both reductions in plateau modulus and $T_g$ value are consistent with a deteriorated network structure after molding, suggesting that thiourethane dynamic chemistry does not work well with a stoichiometrically balanced reaction system.

The less than satisfactory property recovery after reprocessing could be due to side reactions associated with isocyanate groups. When molding these materials made with stoichiometrically balanced thiol and isocyanate groups, the dissociative reversible reaction of thiourethane should play a more important role in side reactions in comparison with the associative exchange reaction between thiol and thiourethane groups, since free thiol groups can only be generated via reversible reaction. Upon reversion, highly reactive free isocyanate groups were also generated at molding temperature. Given that the molding employed a hot press in air, free isocyanate groups were exposed to a combination of high temperature and moisture absorbed by the elastomer (the network matrix contains a large fraction of PPG, which is capable of absorbing water), which can lead to undesired side reactions and thus property loss.

Figure 5B:
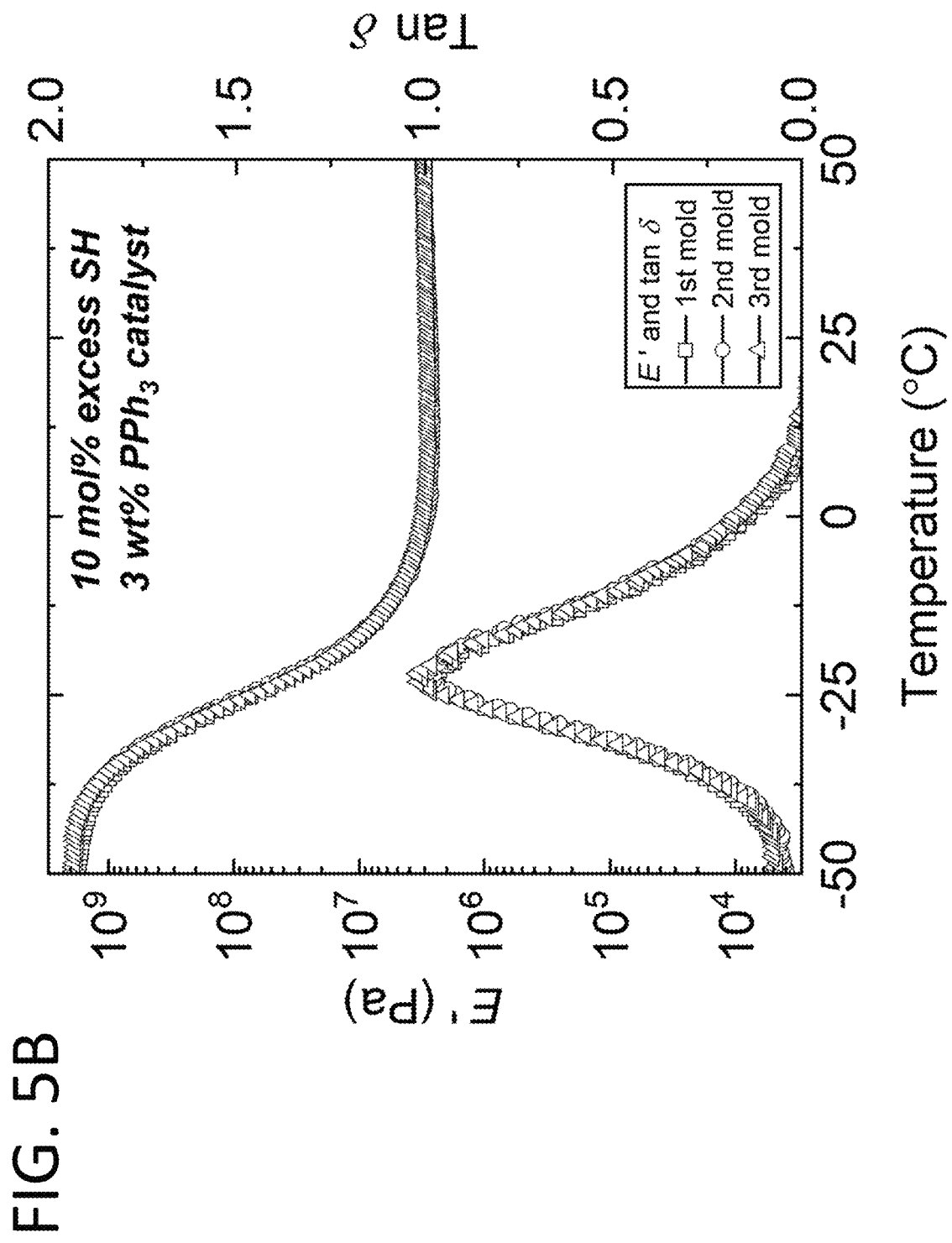
FIG. 5B shows E' and tan δ as functions of temperature for $1^{st}$, $2^{nd}$, and $3^{rd}$ molded thiourethane polymer networks synthesized with 10 mol % excess thiol groups and 3 wt % $PPh_3$ catalyst.
Figure 5C:
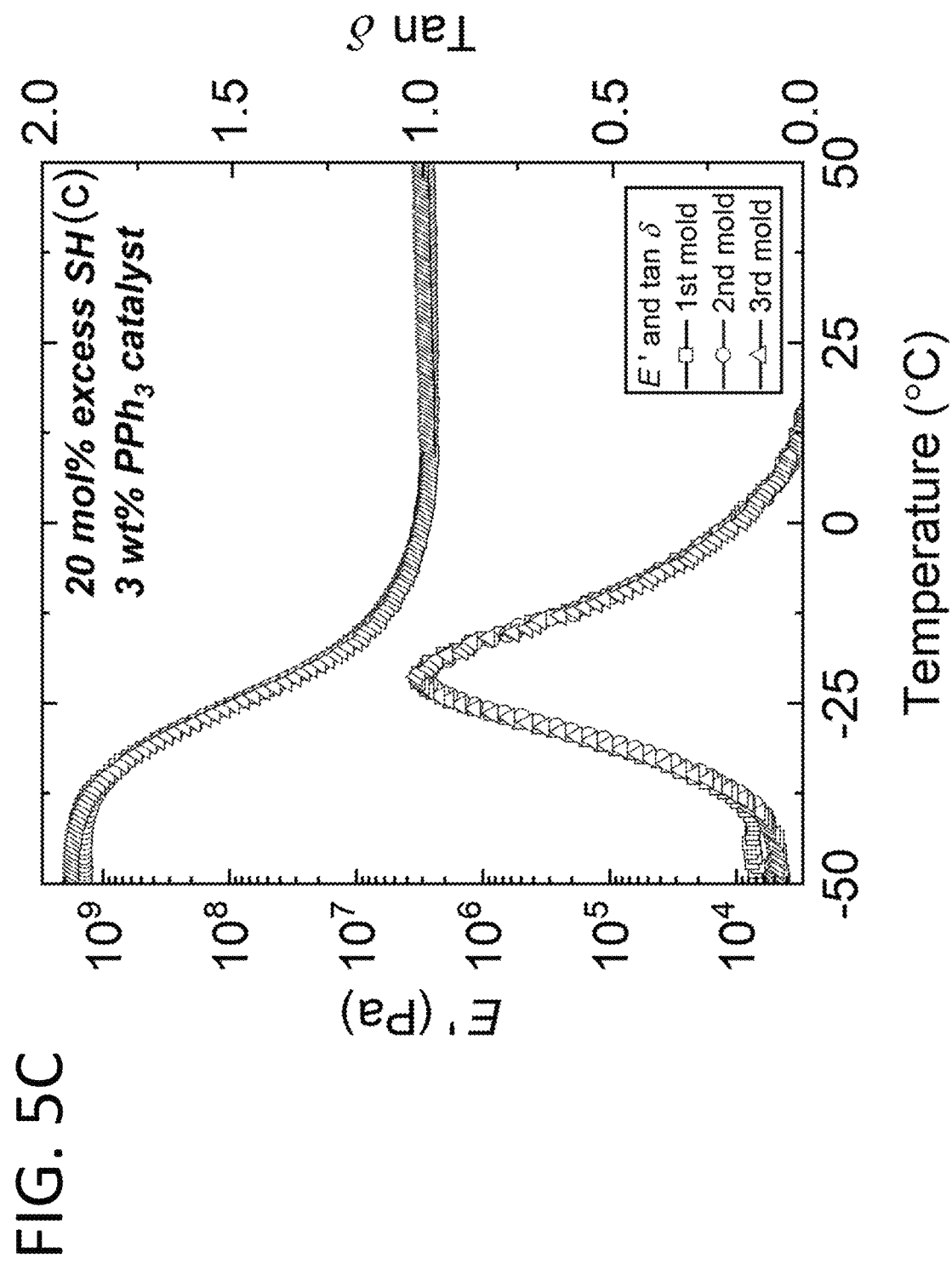
FIG. 5C shows E' and tan δ as functions of temperature for $1^{st}$, $2^{nd}$, and $3^{rd}$ molded thiourethane polymer networks synthesized with 20 mol % excess thiol groups and 3 wt % $PPh_3$ catalyst. Each molding cycle corresponds to hot pressing at 120° C. for 20 min.

To suppress side reactions associated with free isocyanate groups, thiourethane elastomers were prepared with excess thiol groups. During molding, the presence of free thiol groups could have two effects: 1) increasing the propensity of free isocyanates to react with thiol groups, suppressing the dissociative reversible reaction and thus minimizing side reactions; 2) promoting the associative exchange reaction with thiourethane groups, which relies on free thiol groups. Based on this idea, thiourethane elastomers were synthesized with 10 and 20 mol % excess thiol, and their dynamic mechanical property recovery after (re)molding improved dramatically as shown in FIGS. 5B-5C. In both cases with 10 and 20 mol % excess thiol groups, there were excellent property reproductions in going from the $1^{st}$ to $3^{rd}$ mold materials; these very positive outcomes are in sharp contrast with the outcomes obtained in the stoichiometrically balanced case (FIG. 5A). Table 2 also lists the plateau storage modulus values measured at 40° C., which remained the same (within experimental error) after each molding for both the 10 and 20 mol % excess thiol cases.

Tensile tests were also used to characterize the mechanical property recovery of these networks after each molding step; the results are given in Table 2. For thiourethane elastomer with 10 mol % excess thiol, all tensile properties maintained the same values (elongation at break and tensile strength) or reported a slight increase (Young's modulus) with increasing number of molding cycles. For the networks made with 20 mol % excess thiol, Young's modulus exhibited a slight increase with increasing molding cycle whereas elongation at break and tensile strength decreased slightly. This behavior could be due to the molding condition not being optimized, as all samples were molded at 120° C. for 20 min for direct comparison purposes, regardless of composition. Additionally, based on essentially identical FTIR spectra, these materials exhibited no significant change in chemical nature with increasing molding cycle. One may suspect that use of an unbalanced stoichiometry could lead to increased sol fraction, and thus promote processability. However, results from swelling tests indicate that all samples with excess thiol, including remolded samples, maintained highly cross-linked states (gel fraction ≥0.96, remaining nearly unchanged after each molding cycle; see Table 3). In all, incorporation of an appropriate level of excess thiol groups is a highly effective strategy for improving reprocessability of thiourethane-based dynamic networks. Of the conditions studied, it was found that 10 mol % excess thiol yielded the best property recovery after (re)molding, i.e., full tensile and dynamic mechanical property recovery for three molding cycles. The use of stoichiometric imbalance to achieve excellent property recovery after recycling could be instructive for studies of other stoichiometrically balanced dynamic network systems that fail to achieve such excellent property recovery.

Figure 10A:
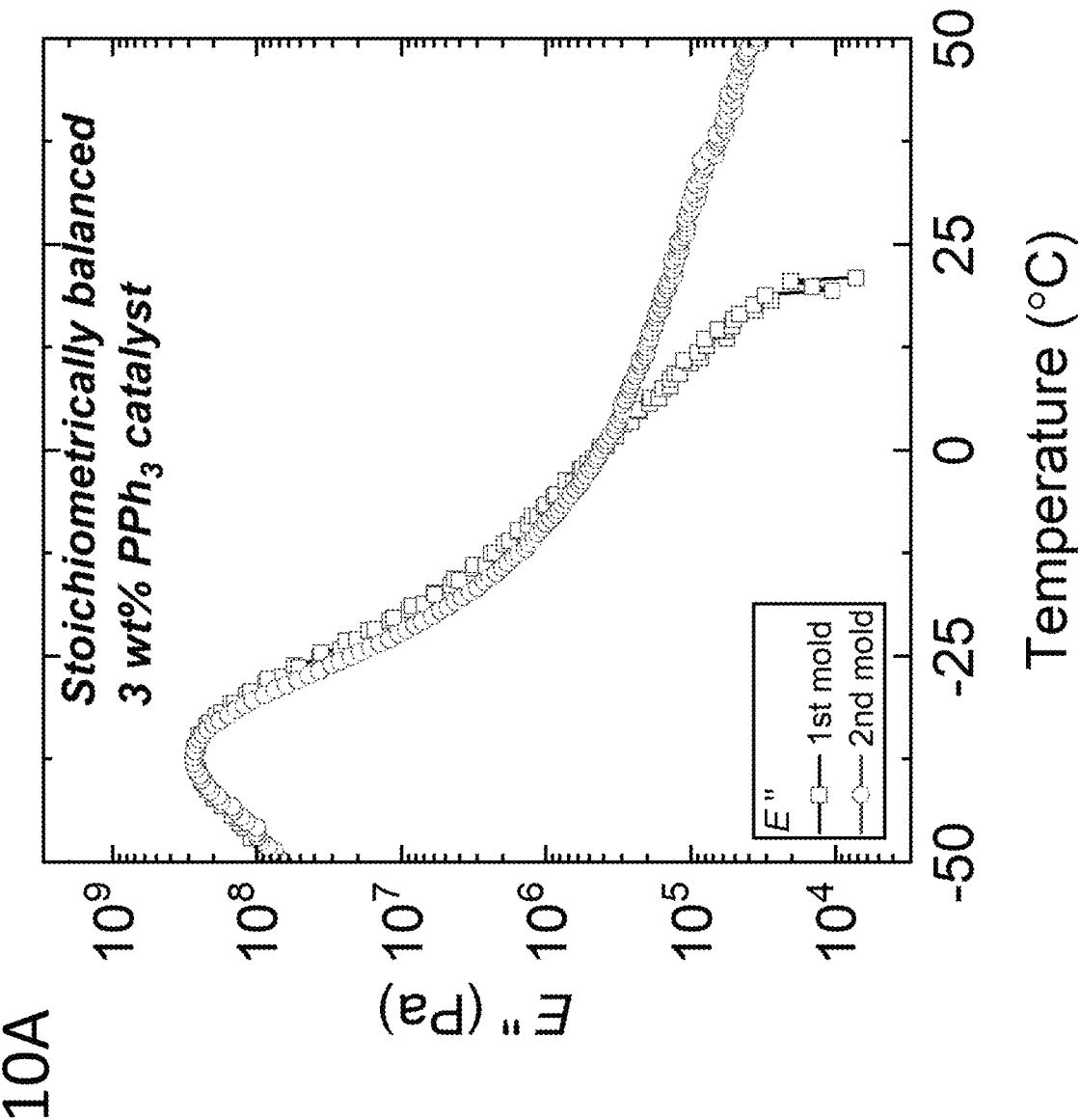
FIG. 10A shows E" as a function of temperature for $1^{st}$ and $2^{nd}$ molded thiourethane polymer networks synthesized with stoichiometrically balanced thiol and isocyanate groups, as well as 3 wt % $PPh_3$ catalyst.
Figure 10B:
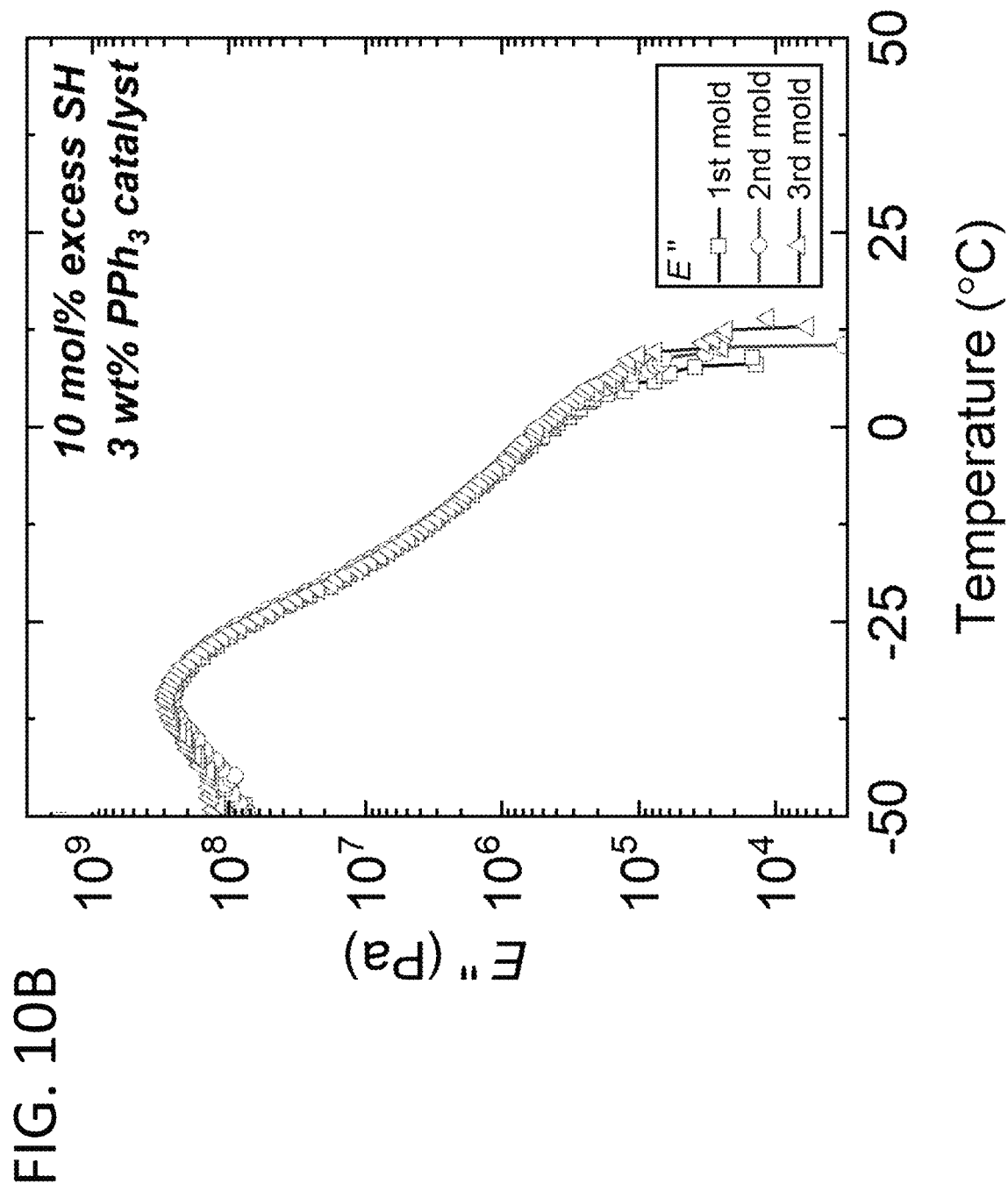
FIG. 10B shows E" as a function of temperature for $1^{st}$, $2^{nd}$, and $3^{rd}$ molded thiourethane polymer networks synthesized with 10 mol % excess thiol groups and 3 wt % $PPh_3$ catalyst.
Figure 10C:
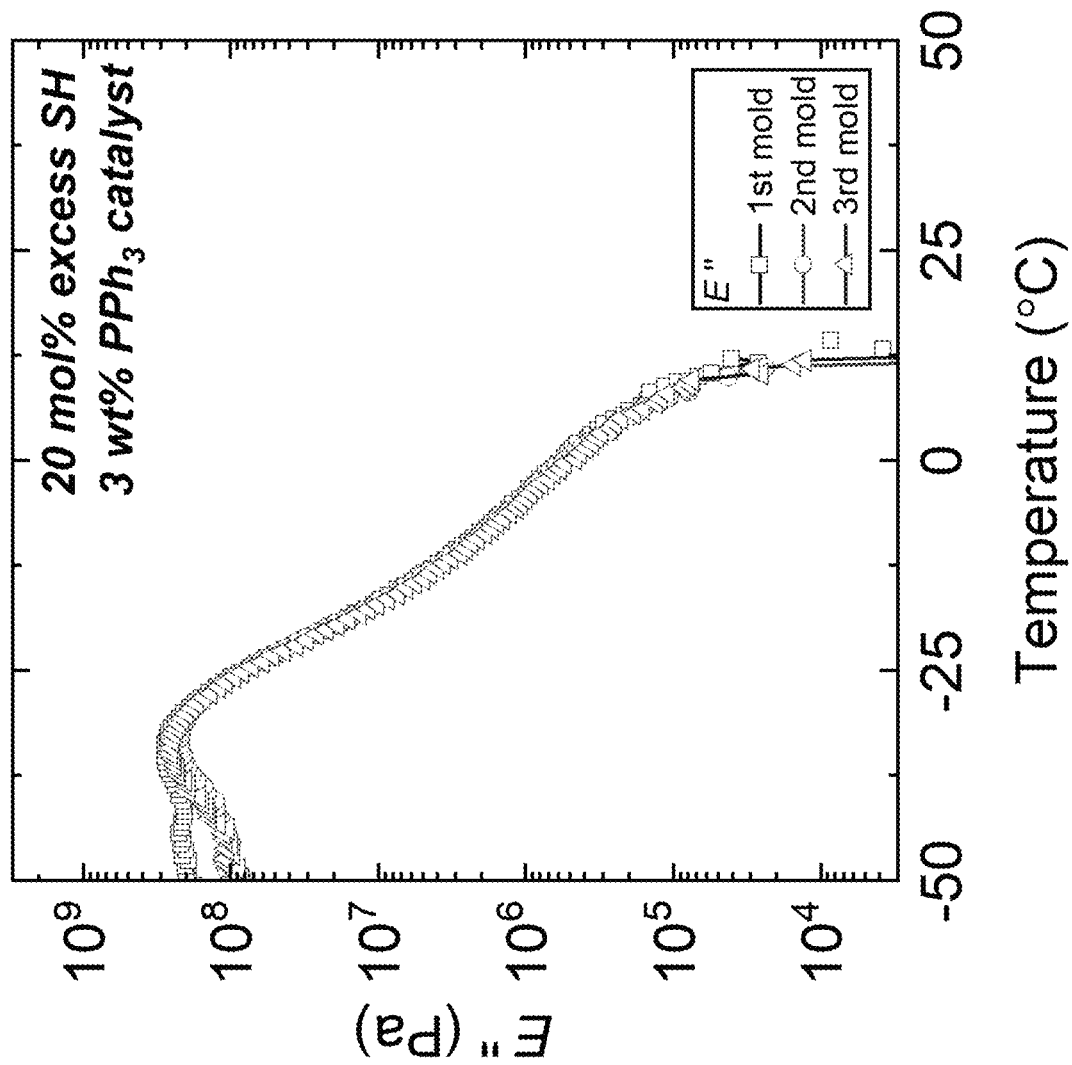
FIG. 10C shows E" as a function of temperature for $1^{st}$, $2^{nd}$, and $3^{rd}$ molded thiourethane polymer networks synthesized with 20 mol % excess thiol groups and 3 wt % $PPh_3$ catalyst. Each molding cycle corresponds to hot pressing at 120° C. for 20 min.
Figure 11A:
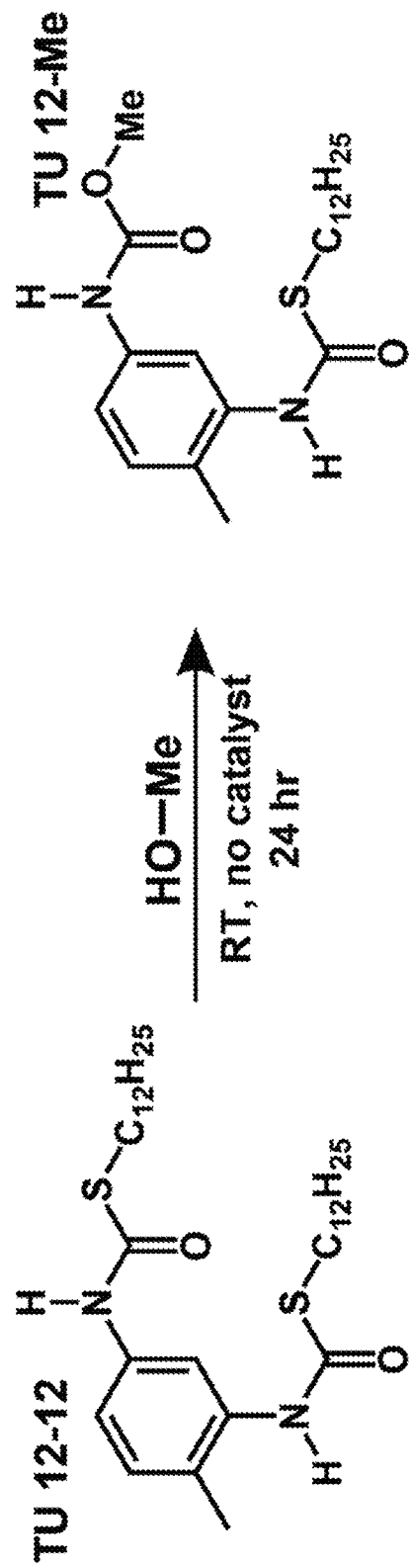
FIG. 11A shows exchange reaction between TU 12-12 thiourethane small molecules and methanol. Note the TU 12-Me structure shown here is a representative structure.
Figures 11B, 11C:
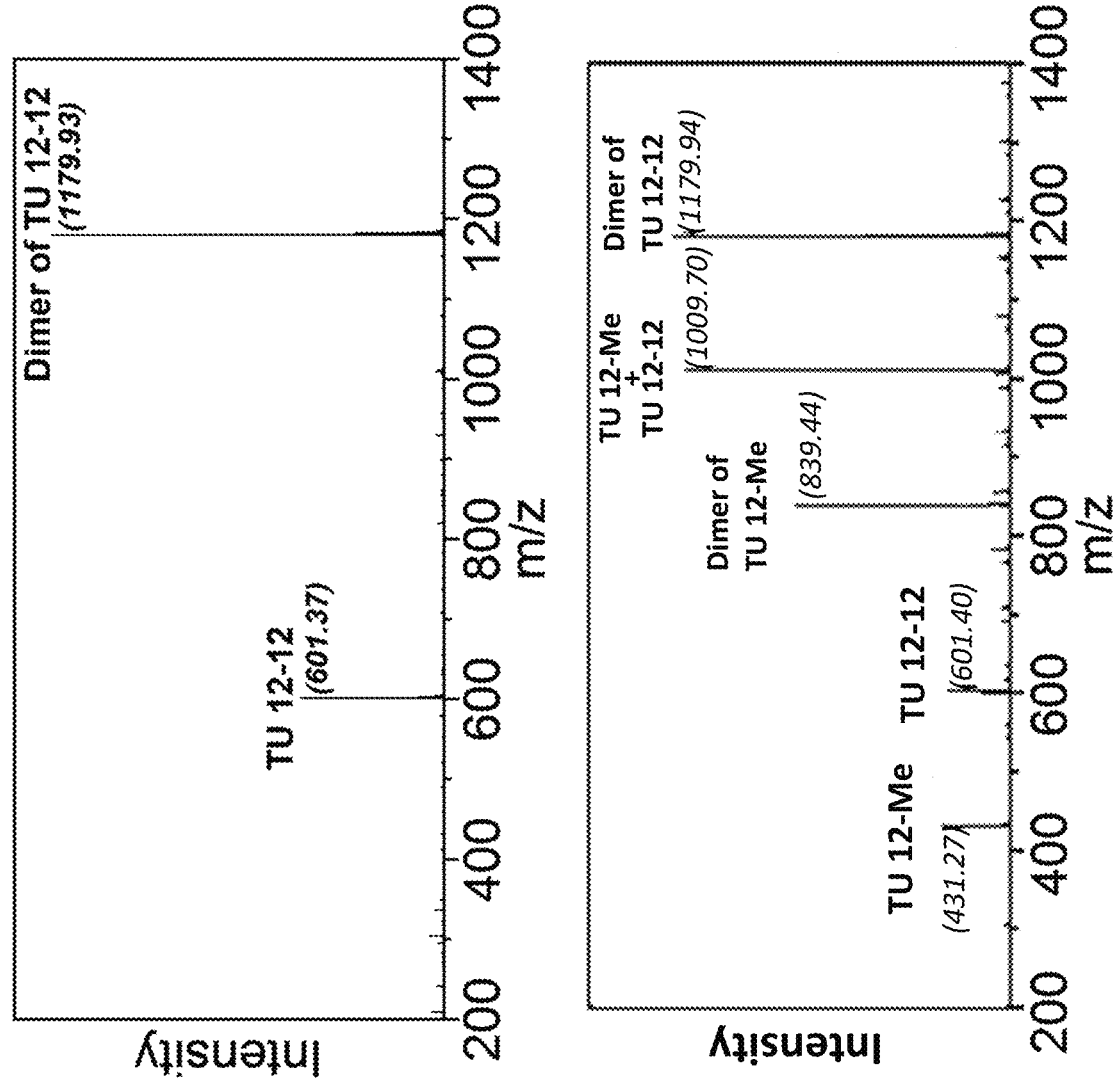
FIG. 11B shows a positive mode LCMS spectrum for TU 12-12 before exchange reaction.
FIG. 11C shows a positive mode LCMS spectrum for products after exchange reaction.

FIG. 10A shows E" as a function of temperature for $1^{st}$ and $2^{nd}$ molded thiourethane polymer networks synthesized with stoichiometrically balanced thiol and isocyanate groups, as well as 3 wt % $PPh_3$ catalyst; FIG. 10B shows E" as a function of temperature for $1^{st}$, $2^{nd}$, and $3^{rd}$ molded thiourethane polymer networks synthesized with 10 mol % excess thiol groups and 3 wt % $PPh_3$ catalyst; FIG. 10C shows E" as a function of temperature for $1^{st}$, $2^{nd}$, and $3^{rd}$ molded thiourethane polymer networks synthesized with 20 mol % excess thiol groups and 3 wt % $PPh_3$ catalyst. Each molding cycle corresponds to hot pressing at 120° C. for 20 min.

TABLE 2

Mechanical test results for thiourethane networks as a function of molding cycles

| | $1^{st}$ mold | $2^{nd}$ mold | $3^{rd}$ mold |
|---|---|---|---|
| Networks with 10 mol % excess SH and 3 wt % $PPh_3$ | | | |
| E' measured at 40° C. | 2.86 ± 0.08 | 2.88 ± 0.11 | 2.89 ± 0.04 |
| Young's modulus (MPa) | 2.35 ± 0.20 | 2.73 ± 0.05 | 2.64 ± 0.04 |
| Elongation at break (%) | 97 ± 13 | 78 ± 21 | 87 ± 17 |
| Tensile strength (MPa) | 1.49 ± 0.12 | 1.48 ± 0.21 | 1.53 ± 0.20 |
| Networks with 20 mol % excess SH and 3 wt % $PPh_3$ | | | |
| E' measured at 40° C. | 2.83 ± 0.11 | 2.61 ± 0.04 | 2.83 ± 0.08 |
| Young's modulus (MPa) | 2.15 ± 0.06 | 2.47 ± 0.07 | 2.56 ± 0.05 |
| Elongation at break (%) | 130 ± 15 | 96 ± 15 | 73 ± 11 |
| Tensile strength (MPa) | 1.66 ± 0.13 | 1.54 ± 0.13 | 1.33 ± 0.08 |

TABLE 3

Gel fraction determination of thiourethane polymer networks.

| | Weight of materials before swelling (mg) | Weight of dry materials after swelling (mg) | Gel fraction |
|---|---|---|---|
| Networks with 10 mol % excess SH and 3 wt % $PPh_3$ | | | |
| As-synthesized | 331.29 | 319.63 | 0.96 |
| $1^{st}$ mold | 306.02 | 294.37 | 0.96 |
| $2^{nd}$ mold | 304.84 | 293.65 | 0.96 |
| $3^{rd}$ mold | 373.64 | 356.91 | 0.96 |
| Networks with 20 mol % excess SH and 3 wt % $PPh_3$ | | | |
| As-synthesized | 294.7 | 292.91 | 0.99 |
| $1^{st}$ mold | 289.15 | 285.95 | 0.99 |
| $2^{nd}$ mold | 303.49 | 298.81 | 0.98 |
| $3^{rd}$ mold | 276.48 | 270.77 | 0.98 |

Stress Relaxation of Thiourethane Networks as a Function of Excess Thiol and Temperature.

In an attempt to better understand the implications of excess thiol groups on the mechanism of the thiourethane network structure change upon (re)molding, the stress relaxation behavior associated with thiourethane dynamic networks was characterized under conditions of stoichiometric balance as well as with 10 mol % excess thiol groups. As mentioned above, the addition of free thiol groups should promote the associative exchange mechanism relative to the dissociative reversible mechanism. The inventors acknowledge that stress relaxation behavior in dynamic polymer networks is complex, is as yet not well understood, and is impacted by many factors in addition to the mechanism of the network structure change. However, with other factors being approximately equal, the inventors believe that qualitative observations from such measurements can be useful in obtaining greater understanding of the changes that occur as a polymer network exhibiting both associative and dissociative dynamic chemistries is altered from stoichiometric balance.

Figure 6A:
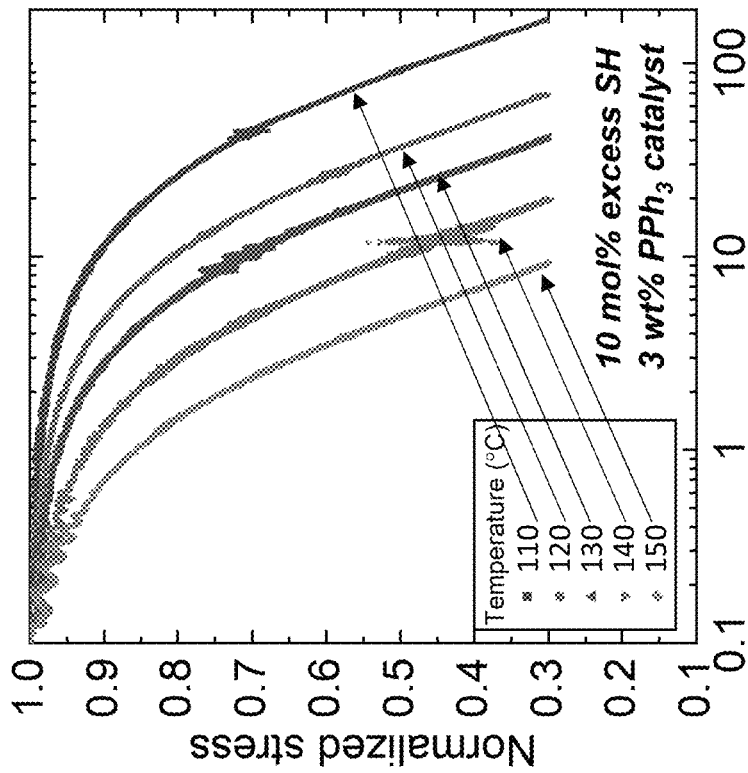
FIG. 6A shows normalized stress relaxation curves at different temperatures for thiourethane networks synthesized with 10 mol % excess thiol groups and 3 wt % $PPh_3$ catalyst.
Figure 6B:
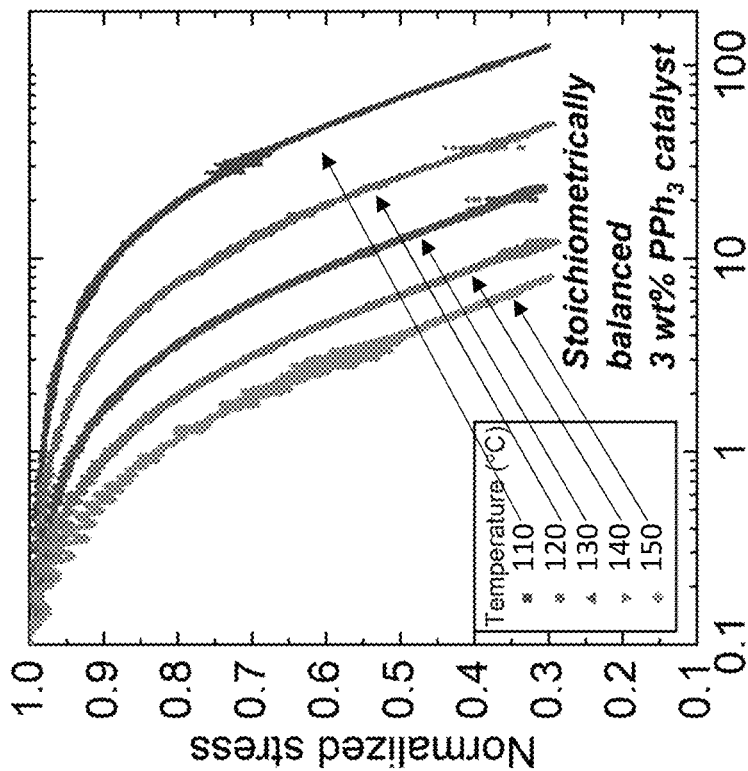
FIG. 6B shows normalized stress relaxation curves at different temperatures for thiourethane networks synthesized with stoichiometrically balanced thiol and isocyanate groups, as well as 3 wt % $PPh_3$ catalyst.

FIGS. 6A-6B show the stress relaxation behaviors at different temperatures for both the stoichiometrically balanced system and the 10 mol % excess thiol system. The resulting stress relaxation data were fit via the Kohlrausch- Williams-Watts (KWW) stretched exponential decay function: (Chen, X. et al., *ACS Appl. Mater. Interfaces* 2019, 11, 2398-2407; and Hooker, J. C. et al., *Macromolecules* 1995, 28, 7683-7692.)

$$\frac{\sigma(t)}{\sigma_0} = \exp[-(t/\tau^*)^\beta] \quad (1)$$

where $\sigma(t)/\sigma_0$ is the normalized stress at time t; $\tau^*$ is a characteristic relaxation time; and $\beta$ ($0 \leq \beta \leq 1$) is the exponent that reflects the breadth of the relaxation distribution. The average relaxation time, $\langle\tau\rangle$, is given by $$\langle\tau\rangle = \frac{\tau^* \Gamma(1/\beta)}{\beta} \quad (2)$$

where $\Gamma$ represents the gamma function. The best-fit average relaxation times and $\beta$ values are given in Table 4. Upon increasing the level of excess thiol groups from 0 to 10 mol %, there is a substantial increase, as much as ~75%, in $\langle\tau\rangle$ across the temperature range over which stress relaxation measurements were made. This increase in $\langle\tau\rangle$ with 10 mol % excess thiol groups is consistent with an underlying change associated with the mechanism of network restructuring via thiourethane dynamic chemistry. (Free thiol groups promote the associative exchange mechanism.) Although thiourethane reversion may be considered undesirable from a reprocessing perspective because of potential side reactions with isocyanate groups, reversion provides significant mobility for network structure change because the cross-link density decreases with thiourethane reverting to isocyanate and thiol groups. In contrast, cross-link density is theoretically unchanged during thiol-thiourethane exchange reactions. Thus, other factors being equal, any factor that would suppress thiourethane reversion and promote exchange reactions should lead to a slower process of network structure change, which is what was observed upon designing a reprocessable thiourethane network with 10 mol % excess thiol groups.

Implications on Reprocessing Temperature and Timescale.

Although the thiourethane network materials can be reprocessed with excellent property recovery at 120° C. for 20 min, which is at a considerably lower temperature for shorter time in comparison with previous studies targeting PU or PU-like reprocessable polymer networks, practical use of these reprocessable network materials will likely require even faster reprocessing. Notably, stress relaxation results in Table 4 demonstrate the potential of reprocessing the thiourethane networks for much less than 20 min at elevated temperatures: at 150° C., the average relaxation time for the thiourethane network with 10 mol % excess thiol groups is 7.7 s, which is only 1/8 of the average relaxation time measured at 120° C. Given that stress relaxation and reprocessing both rely in part on the dynamic chemistry to change network structures, the factor of 8 reduction in average relaxation time in going from 120° C. to 150° C. indicates that reprocessing of the thiourethane network materials could be done in much less than 20 min at 150° C.

Figure 7:
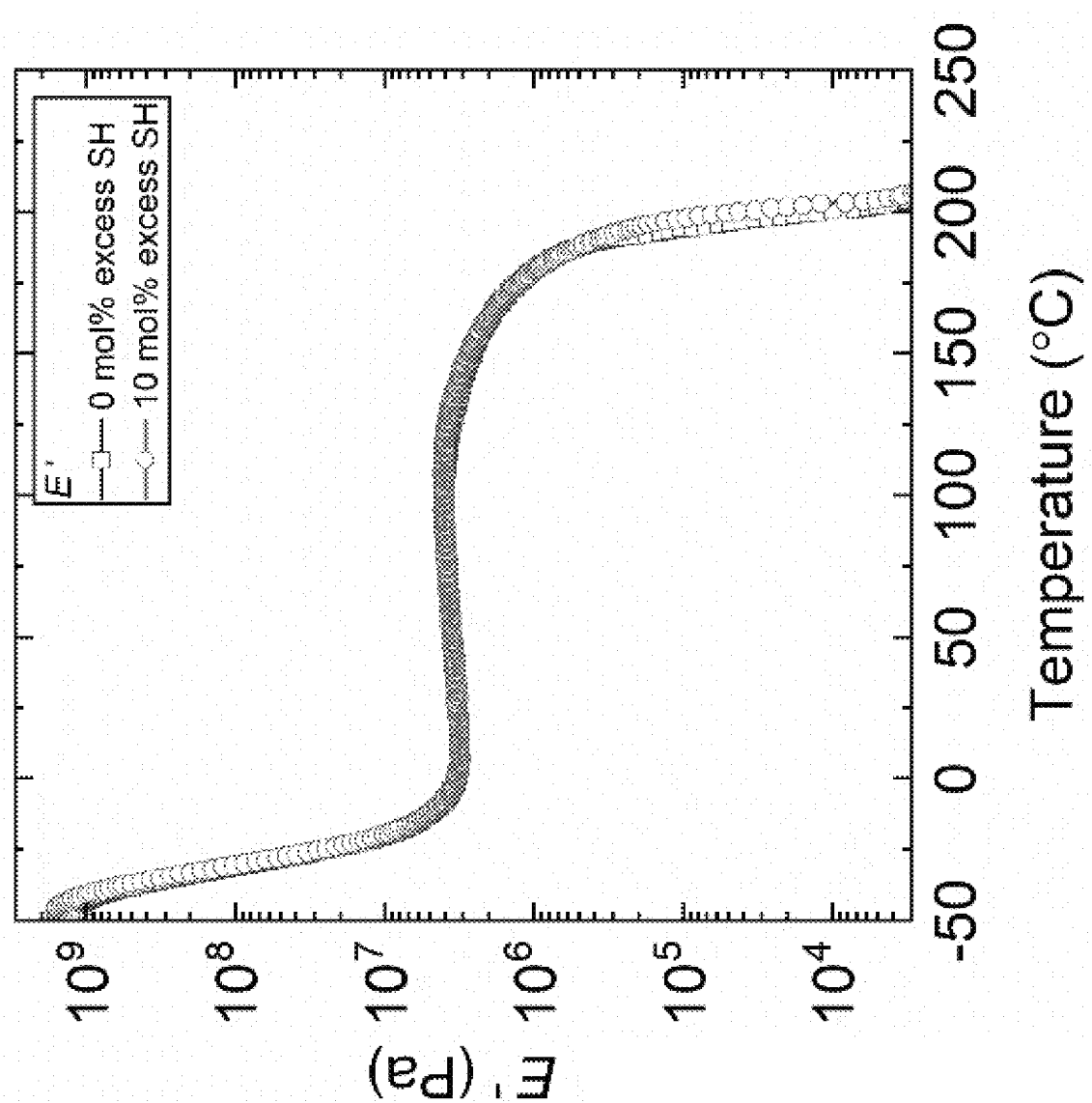
FIG. 7 shows E' as a function of temperature for $1^{st}$ molded thiourethane polymer networks synthesized with stoichiometrically balanced thiol and isocyanate groups or 10 mol % excess thiol groups, as well as 3 wt % $PPh_3$ catalyst. Measurements were carried out to over 200° C.

At temperatures above 150° C., the thiourethane networks exhibited even greater malleability/processability as shown in high temperature DMA measurements (FIG. 7): E' decreased dramatically with increasing temperature over 150° C., which indicates the further potential of highly efficient reprocessing. However, in contrast with the slightly increasing E' value with increasing temperature from ~0 to ~100° C., which is consistent with a robust network topology, the major decrease in E' with temperature at above 150° C. is indicative of the loss of network structure, which could have caused an increasingly dominant thiourethane reversion mechanism with increasing temperature.

Alcohol Solvolysis of Thiourethanes to Recover Monomeric Thiol.

Aside from reprocessing, an alternative route to recycle polymer networks involves decross-linking and depolymerizing the material to recover or partially recover feedstocks used for synthesis. A major advantage of this method is that the recovered feedstocks do not need to be limited to synthesis of the same materials; thus, the recycled feedstocks can be used in a more flexible manner. Here, it is demonstrated that thiourethane dynamic chemistry provides the ability to recover monomers, specifically thiol monomers, through simple alcohol solvolysis.

Figure 8A:
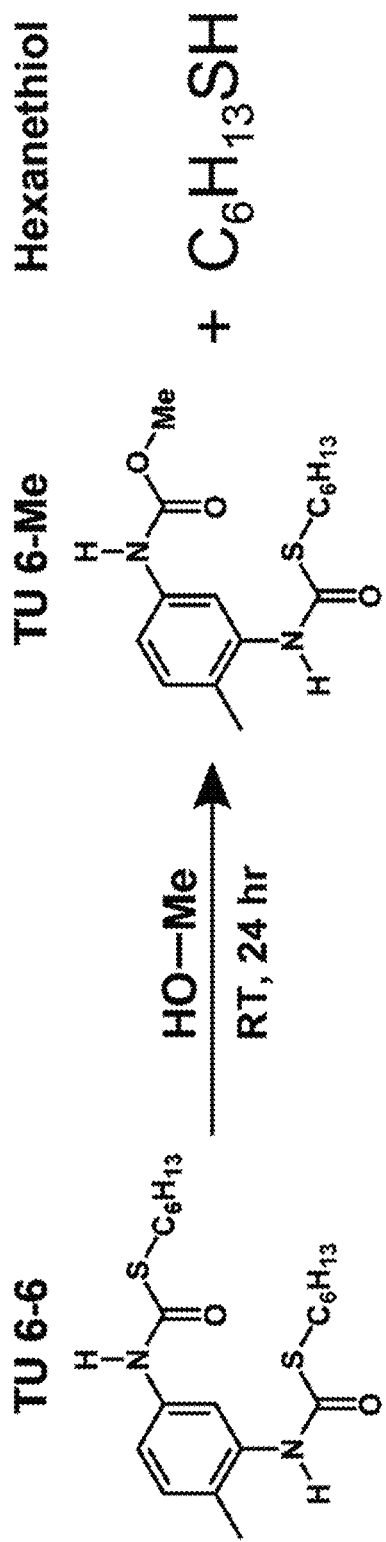
FIG. 8A shows exchange reaction between TU 6-6 thiourethane small molecules and methanol. Note that the TU 6-Me structure shown here is a representative structure.
Figure 8B:
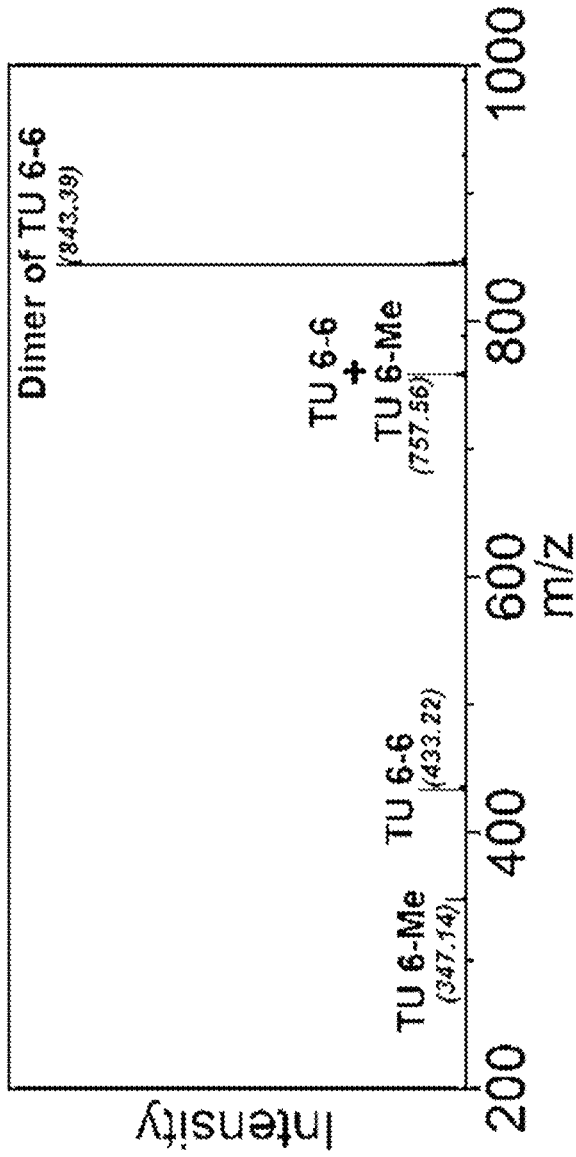
FIG. 8B shows positive mode and FIG. 8C shows negative mode LCMS spectra for products after exchange reaction.

First, a small-molecule model system was used to demonstrate the reaction between thiourethane and alcohol. Specifically, thiourethane TU 6-6 and methanol were mixed together in DCM solvent and reacted at room temperature (FIG. 8A). FIG. 8B shows the LCMS spectrum of the resulting mixture after 24 h. In comparison with the spectrum of pure TU 6-6 molecules in FIG. 2B, new peaks emerge at 347.14 and 757.56 m/z. Given that the molecular weight difference between hexanethiol (118.24 g/mol) and methanol (32.04 g/mol) is 86.20 g/mol, and the m/z difference between the new peak at 347.14 and the peak for TU 6-6 (433.22 m/z) is 86.08, the peak at 347.14 m/z corresponds to TU 6-Me (charged with a sodium ion), which is the product of TU 6-6 reacting with methanol. Similarly, the peak at 757.56 m/z corresponds to the adduct of TU 6-6 and TU 6-Me molecules. It is important to note that the TU 6-Me structure shown in FIG. 8A is a representative structure, as methanol could react with both thiourethane groups linked

TABLE 4

Average relaxation time and β determined from stress relaxation measurements.

Figure 8C:
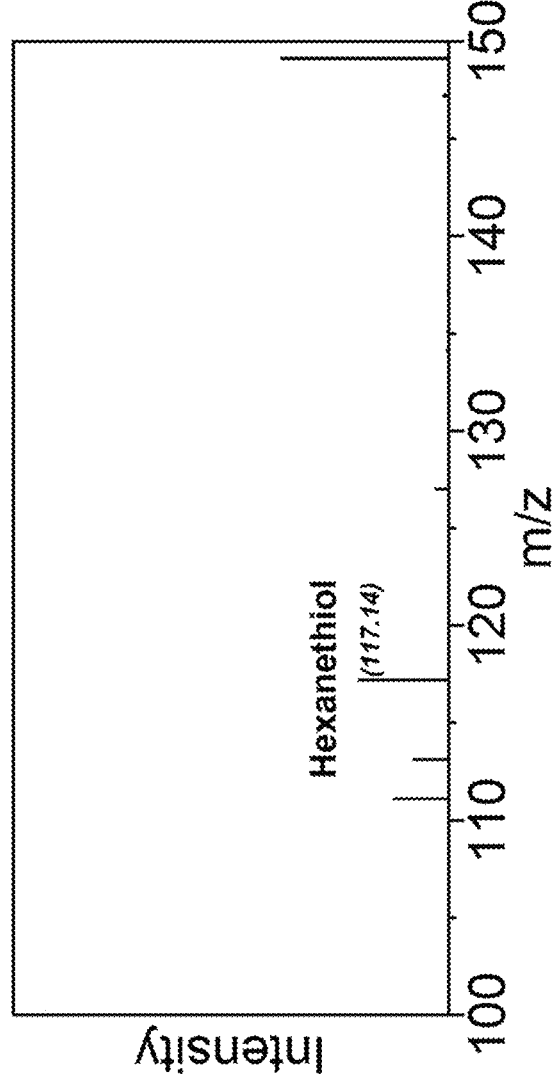

| | Temperature | | | | | | | | | |
|---|---|---|---|---|---|---|---|---|---|---|
| | 110 | | 120 | | 130 | | 140 | | 150 | |
| | ⟨τ⟩ (s) | β | ⟨τ⟩ (s) | β | ⟨τ⟩ (s) | β | ⟨τ⟩ (s) | β | ⟨τ⟩ (s) | β |
| 0 mol % excess SH with 3 wt % PPh₃ | 108 | 0.90 | 41.8 | 0.90 | 20.2 | 0.90 | 10.2 | 0.91 | 6.6 | 0.88 |
| 10 mol % excess SH with 3 wt % PPh₃ | 146 | 0.90 | 59.0 | 0.90 | 35.1 | 0.90 | 16.5 | 0.89 | 7.7 | 0.91 | to the aromatic ring. Additionally, in the negative mode LCMS spectrum shown in FIG. 8C, a peak was found at 117.14, which matches hexanethiol molecules (118.24 g/mol) with a negative charge (−H⁺, −1.01 g/mol). Therefore, the model system demonstrated herein shows that monomeric thiol can be regenerated from corresponding thiourethanes through alcohol solvolysis.

To demonstrate this solvolysis reaction in thiourethane networks, 300 mg of thiourethane elastomers (synthesized with 10 mol % excess thiols) was mixed with methanol in DCM solvent. After reacting a week under mild heating (on a hot plate set at 60° C.), a solution with no solid was obtained. (Note that a control system with only DCM solvent and no methanol yielded only swollen thiourethane elastomers.) These results indicate that alcohol solvolysis is effective in decross-linking thiourethane network materials.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A polythiourethane composition comprising:
a polythiourethane polymer network comprising polymer chains crosslinked by crosslinks comprising a non-aromatic branched core and free thiol groups, wherein the polymer chains are covalently linked to the crosslinks via thiourethane linkages; and
a first catalyst that catalyzes reactions between thiol groups and isocyanate groups, wherein the first catalyst is not an organophosphine.

2. The composition of claim 1, wherein the mole ratio of free thiol groups to thiourethane linkages in the polythiourethane polymer network is no greater than 1:5.

3. The composition of claim 1, wherein the mole ratio of free thiol groups to thiourethane linkages in the polythiourethane polymer network is in the range from 1:20 to 1:5.

4. The composition of claim 1, wherein the first catalyst is a basic catalyst.

5. A polythiourethane composition comprising:
a polythiourethane polymer network comprising polymer chains crosslinked by crosslinks comprising a non-aromatic branched core and free thiol groups, wherein the polymer chains are covalently linked to the crosslinks via thiourethane linkages;
a first catalyst that catalyzes reactions between thiol groups and isocyanate groups; and
a second catalyst that catalyzes reactions between thiol groups and isocyanate groups, wherein the first catalyst is a basic catalyst having a pKa in water at 20° C. of at least 10 and the second catalyst is a basic catalyst having a pKa in water at 20° C. of 6 or lower.

6. The composition of claim 5, wherein the first catalyst is an amidine and the second catalyst is an organophosphine.

7. The composition of claim 5, wherein the first catalyst is 1,8-diazabicyclo[5.4.0]undec-7-ene or 1,5-diazabicyclo[4.3.0]non-5-ene and the second catalyst is triphenylphosphine.

8. A method of forming a dynamic polythiourethane polymer network, the method comprising:
forming a composition comprising:
a polymer having at least two isocyanate groups;
a multifunctional thiol crosslinker comprising a non-aromatic branched core and at least three free thiol groups, wherein the free thiol groups are present in a superstoichiometric concentration with respect to the isocyanate groups; and
a first catalyst that catalyzes reactions between thiol groups and isocyanate groups, wherein the first catalyst is not an organophosphine; and
reacting the isocyanate groups on the polymer with the free thiol groups on the multifunctional thiol crosslinker to form a crosslinked polythiourethane polymer network.

9. The method of claim 8, wherein the polymer is a tolylene 2,4-diisocyanate -terminated polyether.

10. A method of reprocessing a polythiourethane polymer network comprising polymer chains crosslinked by crosslinks comprising a non-aromatic branched core and free thiol groups, wherein the polymer chains are covalently linked to the crosslinks via thiourethane linkages; and a first catalyst that catalyzes reactions between thiol groups and isocyanate groups, the method comprising:
heating the polythiourethane polymer network to a first temperature that induces reversible thiourethane bond cleavage;
reshaping the polythiourethane polymer network; and
cooling the polythiourethane polymer network to a second temperature at which the reversible thiourethane bond cleavage is arrested.

11. The method of claim 10, wherein the polythiourethane polymer network is heated to the first temperature for a period of no more than 20 minutes.

12. The method of claim 11, wherein the first temperature is in the range from 120° C. to 160° C.

13. The method of claim 10, wherein the polythiourethane polymer network further comprises a second catalyst that catalyzes reactions between thiol groups and isocyanate groups, wherein the first catalyst is a basic catalyst having a pKa in water at 20° C. of at least 10 and the second catalyst is a basic catalyst having a pKa in water at 20° C. of 6 or lower.

14. A polythiourethane composition comprising:
a polythiourethane polymer network comprising polymer chains crosslinked by crosslinks comprising free thiol groups, wherein the polymer chains are covalently linked to the crosslinks via thiourethane linkages;
a first basic catalyst that catalyzes reactions between thiol groups and isocyanate groups, the first basic catalyst having a pKa in water at 20° C. of at least 10; and
a second basic catalyst that catalyzes reactions between thiol groups and isocyanate groups, the second basic catalyst having a pKa in water at 20° C. of 6 or lower.

15. A method of forming a dynamic polythiourethane polymer network, the method comprising:
forming a composition comprising:
a polymer having at least two isocyanate groups;
a multifunctional thiol crosslinker comprising at least three free thiol groups, wherein the free thiol groups are present in a superstoichiometric concentration with respect to the isocyanate groups;
a first basic catalyst that catalyzes reactions between thiol groups and isocyanate groups, the first basic catalyst having a pKa in water at 20° C. of at least 10; and
a second basic catalyst that catalyzes reactions between thiol groups and isocyanate groups, the second basic catalyst having a pKa in water at 20° C. of 6 or lower; and
reacting the isocyanate groups on the polymer with the free thiol groups on the multifunctional thiol crosslinker to form a crosslinked polythiourethane polymer network comprising polymer chains crosslinked by crosslinks comprising free thiol groups, wherein the polymer chains are covalently linked to the crosslinks via thiourethane linkages.

16. A method of reprocessing a polythiourethane polymer network comprising: polymer chains crosslinked by crosslinks comprising free thiol groups, wherein the polymer chains are covalently linked to the crosslinks via thiourethane linkages; a first basic catalyst that catalyzes reactions between thiol groups and isocyanate groups, the first basic catalyst having a pKa in water at 20° C. of at least 10; and a second basic catalyst that catalyzes reactions between thiol groups and isocyanate groups, the second basic catalyst having a pKa in water at 20° C. of 6 or lower, the method comprising:
heating the polythiourethane polymer network to a first temperature that induces reversible thiourethane bond cleavage;
reshaping the polythiourethane polymer network; and
cooling the polythiourethane polymer network to a second temperature at which the reversible thiourethane bond cleavage is arrested.

17. A method of recovering multifunctional thiol monomers from a polythiourethane polymer network comprising: polymer chains crosslinked by crosslinks comprising free thiol groups, wherein the polymer chains are covalently linked to the crosslinks via thiourethane linkages; and a first catalyst that catalyzes reactions between thiol groups and isocyanate groups, wherein the first catalyst is not an organophosphine, the method comprising: reacting the polythiourethane polymer network with an alcohol that cleaves thiourethane linkages to generate multifunctional thiol monomers and diisocyanate polymers; and separating the multifunctional thiol monomers from the diisocyanate polymers.

18. The method of claim 17, wherein the alcohol comprises methanol.

19. The method of claim 17, wherein the crosslinkers comprise a non-aromatic branched core.

20. The method of claim 17, wherein the first catalyst is a basic catalyst has a pKa in water at 20° C. of at least 10; and the polythiourethane polymer network further comprises a second basic catalyst that catalyzes reactions between thiol groups and isocyanate groups, the second basic catalyst having a pKa in water at 20° C. of 6 or lower.

21. The composition of claim 1, wherein the first catalyst is a basic catalyst having a pKa in water at 20° C. of at least 10.

22. The composition of claim 21, wherein the first catalyst is a tertiary amine or an amidine.

23. The composition of claim 1, wherein the polythiourethane polymer network is the reaction product of a polymer having at least two isocyanate groups and a multifunctional thiol crosslinker selected from trimethylolpropane tris(3-mercaptopropionate and pentaerythritol tetrakis(3-mercaptopropionate).

24. The method of claim 8, wherein the multifunctional thiol crosslinker is selected from trimethylolpropane tris(3-mercaptopropionate and pentaerythritol tetrakis(3-mercaptopropionate).

25. The method of claim 8, wherein the first catalyst is a basic catalyst having a pKa in water at 20° C. of at least 10.

26. The method of claim 25, wherein the first catalyst is a tertiary amine or an amidine.

* * * * *